United States Patent
Widmer et al.

(10) Patent No.: US 10,090,885 B2
(45) Date of Patent: Oct. 2, 2018

(54) ANTENNA ALIGNMENT AND VEHICLE GUIDANCE FOR WIRELESS CHARGING OF ELECTRIC VEHICLES

(75) Inventors: Hanspeter Widmer, Wohlenschwil (CH); Lukas Sieber, Olten (CH); Nigel P. Cook, El Cajon, CA (US)

(73) Assignee: QUALCOMM Incorporated, San Diego, CA (US)

( * ) Notice: Subject to any disclaimer, the term of this patent is extended or adjusted under 35 U.S.C. 154(b) by 660 days.

(21) Appl. No.: 13/330,517

(22) Filed: Dec. 19, 2011

(65) Prior Publication Data

US 2012/0262002 A1   Oct. 18, 2012

Related U.S. Application Data

(60) Provisional application No. 61/474,922, filed on Apr. 13, 2011.

(51) Int. Cl.
*H02J 50/12* (2016.01)
*H04B 5/00* (2006.01)
(Continued)

(52) U.S. Cl.
CPC .......... *H04B 5/0037* (2013.01); *B60L 3/0023* (2013.01); *B60L 3/04* (2013.01); *B60L 11/182* (2013.01); *B60L 11/184* (2013.01); *B60L 11/1824* (2013.01); *B60L 11/1829* (2013.01); *B60L 11/1831* (2013.01); *B60L 11/1833* (2013.01); *B60L 11/1842* (2013.01); *B60L 11/1844* (2013.01); *B60L 11/1846* (2013.01); *H02J 5/005* (2013.01); *H02J 7/0027* (2013.01); *H02J 7/025* (2013.01); *H02J 50/12* (2016.02); *H02J 50/20* (2016.02); *B60L 2210/30* (2013.01); *B60L 2210/40* (2013.01); *B60L 2240/36* (2013.01); *B60L 2250/16* (2013.01); *H04B 5/0093* (2013.01); *Y02E 60/721* (2013.01); *Y02T 10/7005* (2013.01);
(Continued)

(58) Field of Classification Search
CPC ....................................................... H01F 38/14
USPC ....................................................... 307/104
See application file for complete search history.

(56) References Cited

U.S. PATENT DOCUMENTS 3,009,525 A    12/1955  De Liban
5,498,948 A *   3/1996  Bruni ................. B60L 11/1816
                                                      320/108

(Continued)

FOREIGN PATENT DOCUMENTS

CN    1610183 A     4/2005
DE    19816762 A1   10/1999
(Continued)

OTHER PUBLICATIONS

International Search Report and Written Opinion—PCT/US2012/032926 —ISA/EPO—Jul. 5, 2012.

*Primary Examiner* — Daniel Kessie
(74) *Attorney, Agent, or Firm* — Knobbe, Martens, Olson & Bear, LLP

(57) ABSTRACT

Embodiments are directed to a wireless power antenna alignment systems and methods for electric vehicles. A system may include a sensor configured to detect the strength of an electromagnetic field in multiple dimensions and a processor configured to determine at least one of a direction and a position of a transmitted beacon signal based on an output of the sensor.

23 Claims, 24 Drawing Sheets

(51) Int. Cl.
*H02J 50/20* (2016.01)
*B60L 3/00* (2006.01)
*B60L 3/04* (2006.01)
*B60L 11/18* (2006.01)
*H02J 7/00* (2006.01)
*H02J 5/00* (2016.01)
*H02J 7/02* (2016.01)

(52) U.S. Cl.
CPC ........ *Y02T 10/7055* (2013.01); *Y02T 10/7072* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | | |
|---|---|---|---|---|
| 7,042,411 | B2 * | 5/2006 | Yagi | H01Q 21/24 343/787 |
| 8,010,205 | B2 * | 8/2011 | Rahman | A61N 1/37229 607/60 |
| 8,362,744 | B2 * | 1/2013 | Terao | H01F 38/14 307/104 |
| 2010/0070219 | A1 * | 3/2010 | Azancot | H02J 5/005 702/62 |
| 2010/0161217 | A1 | 6/2010 | Yamamoto | |
| 2010/0201315 | A1 | 8/2010 | Oshimi et al. | |
| 2010/0277121 | A1 | 11/2010 | Hall et al. | |
| 2010/0308768 | A1 * | 12/2010 | Dower | B60L 11/1818 320/109 |
| 2011/0125007 | A1 * | 5/2011 | Steinberg | A61B 1/00158 600/424 |

FOREIGN PATENT DOCUMENTS

| | | | | |
|---|---|---|---|---|
| EP | 1061631 | A1 | 12/2000 | |
| EP | 1061631 | A1 * | 12/2000 | ............... H02J 7/02 |
| EP | 2199142 | A1 | 6/2010 | |
| FR | 2814243 | A1 | 3/2002 | |
| JP | H0739007 | A | 2/1995 | |
| JP | H07664637 | A | 3/1995 | |
| JP | H09215211 | A | 8/1997 | |
| JP | 1061631 | A1 * | 12/2000 | .......... B60L 11/1805 |
| JP | 2009015683 | A | 1/2009 | |
| JP | 2010124522 | A | 6/2010 | |
| JP | 2010141966 | A | 6/2010 | |
| JP | 2010172185 | A | 8/2010 | |
| JP | 2010-246348 | | * 10/2010 | ............. H02J 17/00 |
| JP | 2010246348 | A | 10/2010 | |
| JP | 2010273472 | A | 12/2010 | |
| WO | WO-2009122355 | A2 | 10/2009 | |
| WO | WO-2010004555 | A1 | 1/2010 | |
| WO | WO2010006078 | A1 | 1/2010 | |
| WO | WO2011046403 | A2 | 4/2011 | |
| WO | WO2011046407 | A2 | 4/2011 | |

* cited by examiner

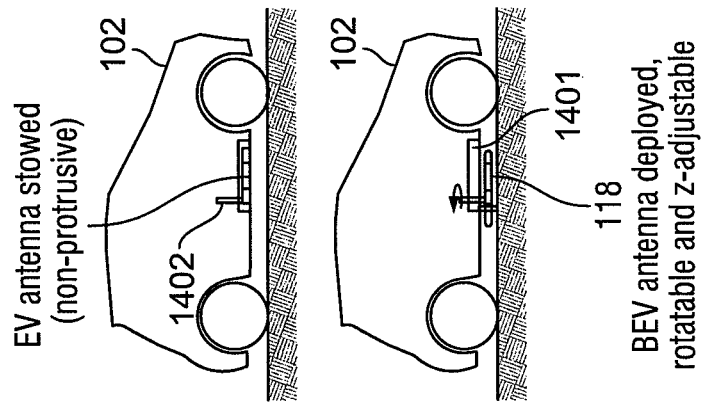
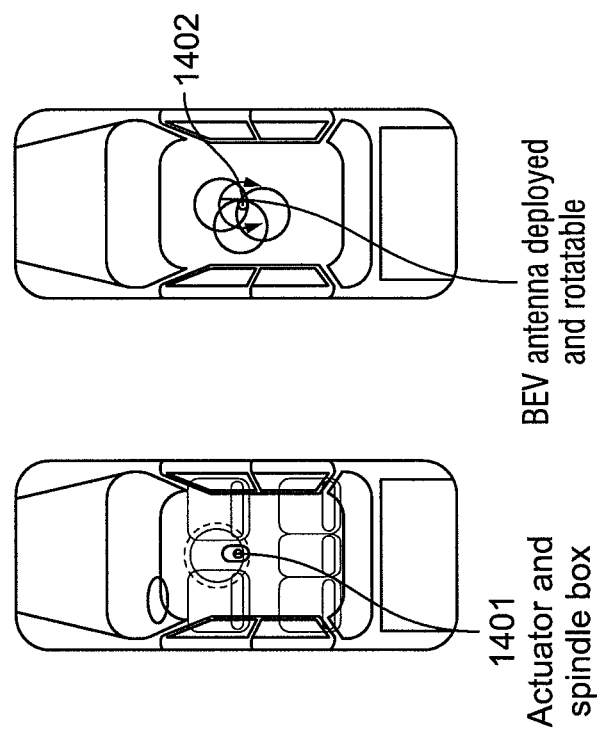
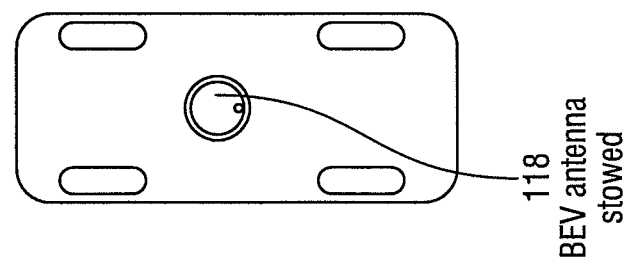
Figure 14A  Figure 14B  Figure 14C  Figure 14D

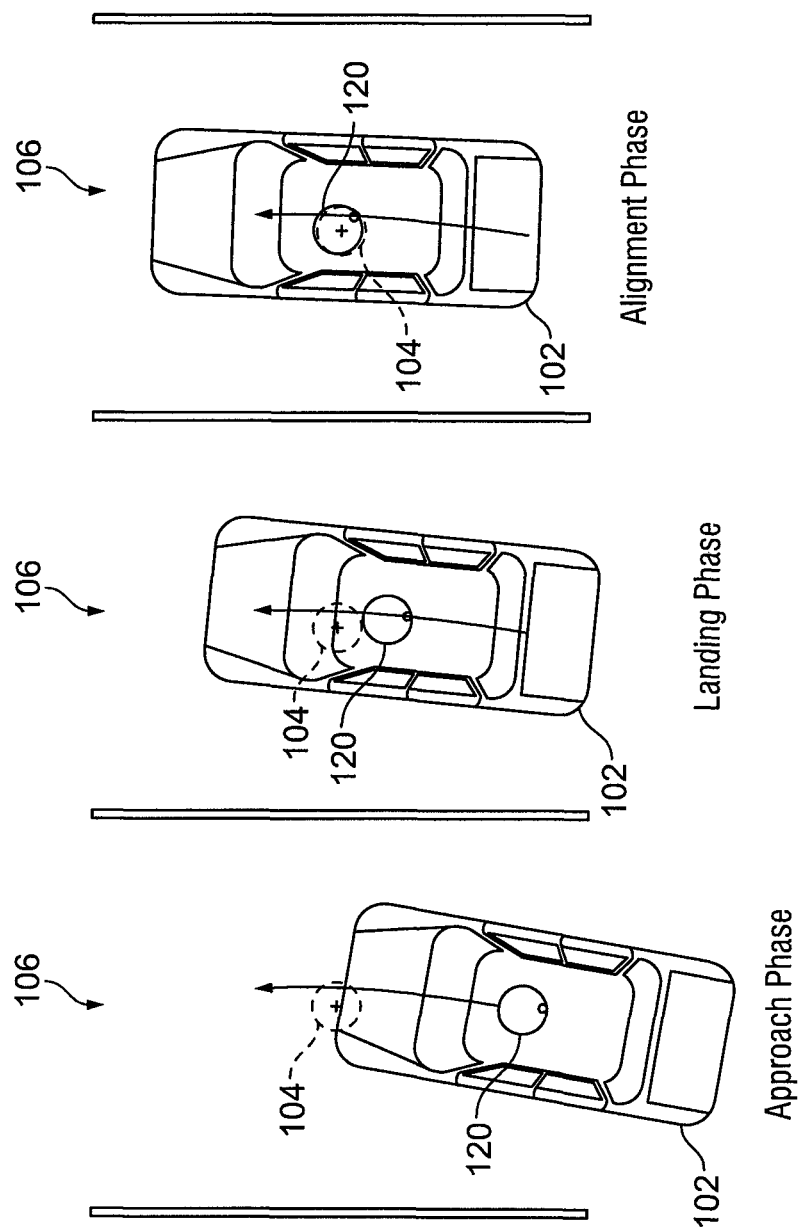
Figure 15A Approach Phase
Figure 15B Landing Phase
Figure 15C Alignment Phase

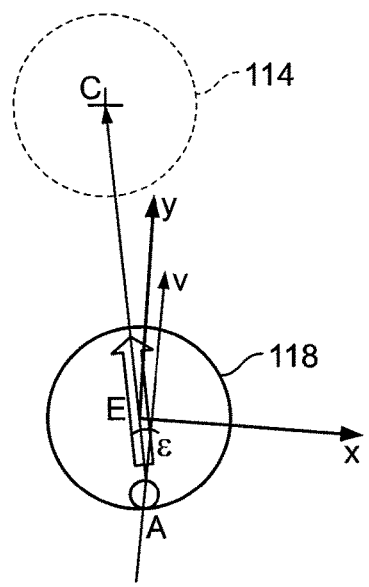
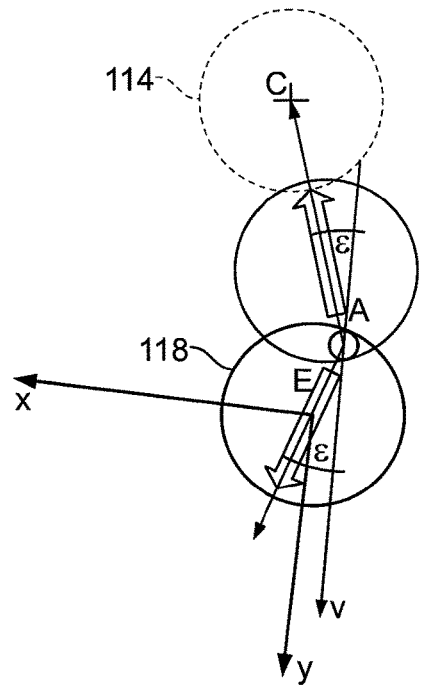
Figure 16A          Figure 16B
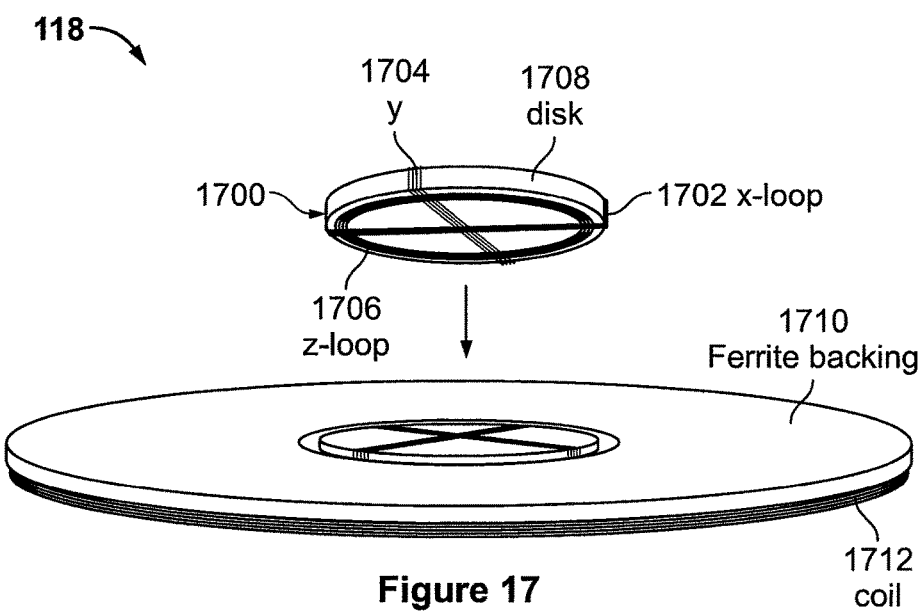
Figure 17

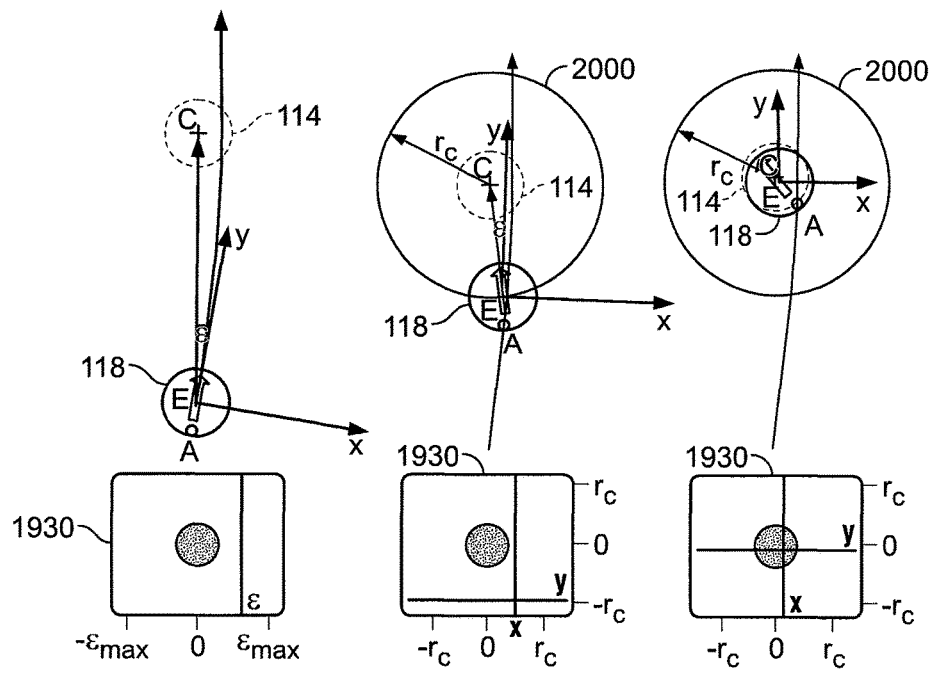
Figure 20A  Figure 20B  Figure 20C
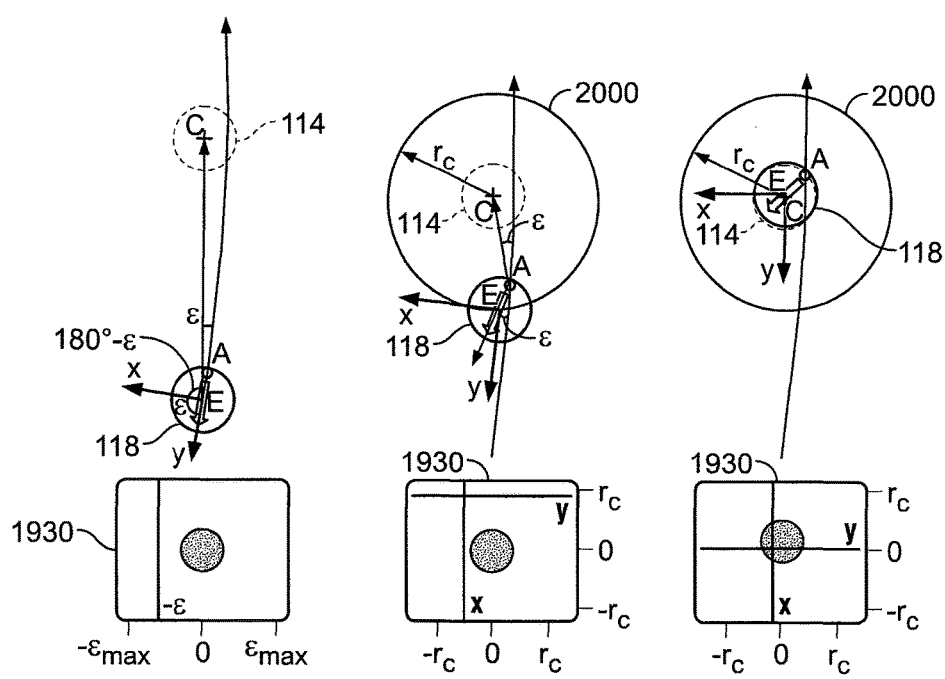
Figure 21A  Figure 21B  Figure 21C

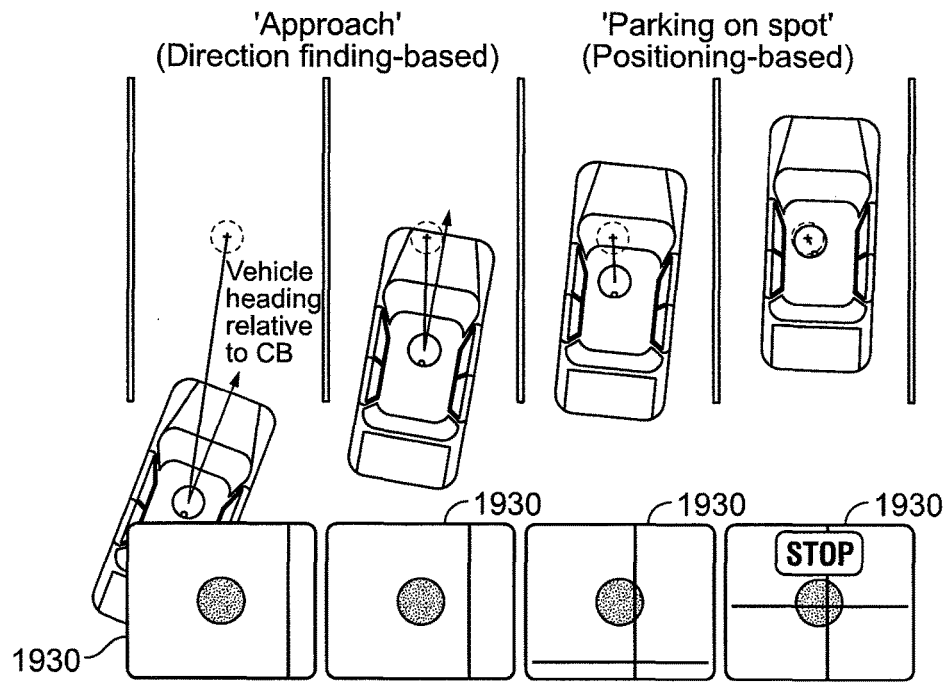
Figure 22A Figure 22B Figure 22C Figure 22D
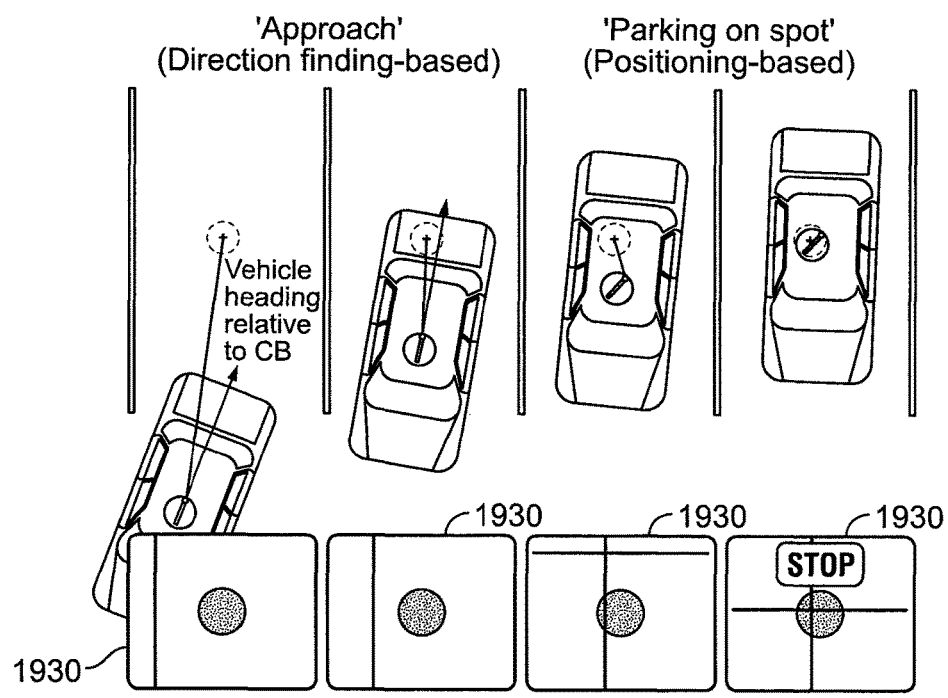
Figure 23A Figure 23B Figure 23C Figure 23D

ANTENNA ALIGNMENT AND VEHICLE GUIDANCE FOR WIRELESS CHARGING OF ELECTRIC VEHICLES

RELATED APPLICATIONS

Claim of Priority Under 35 U.S.C. § 119

This application claims priority benefit under 35 U.S.C. § 119(e) to: U.S. Provisional Patent Application 61/474,922 entitled "ANTENNA ALIGNMENT AND VEHICLE GUIDANCE FOR WIRELESS CHARGING OF ELECTRIC VEHICLES" filed on Apr. 13, 2011, the disclosure of which is hereby incorporated by reference in its entirety.

TECHNICAL FIELD

The present invention relates generally to wireless power transfer, and more specifically to devices, systems, and methods related to wireless power transfer to remote systems such as vehicles including batteries.

BACKGROUND

Approaches are being developed that use over-the-air or wireless power transmission between a transmitter and a receiver coupled to the electronic device to be charged. Such approaches generally fall into two categories. One is based on the coupling of plane wave radiation (also called far-field radiation) between a transmit antenna and a receive antenna on the device to be charged. The receive antenna collects and rectifies the radiated power for charging the battery.

Other approaches to wireless energy transmission techniques are based on inductive coupling between a transmit antenna embedded, for example, in a "charging" mat or surface and a receive antenna (plus a rectifying circuit) embedded in the electronic device to be charged.

Remote systems such as vehicles have been introduced that include locomotion power from electricity received from a battery. For example, hybrid electric vehicles include on-board chargers that use power from vehicle braking and traditional motors to charge the vehicles. Vehicles that are use electric power may also receive the electricity for charging batteries from other sources. Battery electric vehicles (BEVs) are conventionally proposed to be charged through some type of wired alternating current (AC) such as household or commercial AC supply sources. Other proposed charging systems include wirelessly charging a battery from a charging device via a wireless field.

To improve efficiency, a wireless charging system for electric vehicles may include transmit and receive antennas aligned within a certain degree. Differences in distance and alignment of transmit and receive antennas impacts efficient transmission of power. Therefore, a need exists for adapting link parameters in a wireless power transfer system in order to improve, among other things, power transfer, efficiency, and regulatory compliance.

SUMMARY

According to one aspect, an apparatus for receiving wireless power is disclosed. The apparatus includes a sensor coupled to a wireless power receive antenna. The sensor includes a core, a first coil wound about the core, the first coil located in a first plane, a second coil wound about the core, the second coil located in a second plane that is different than the first plane, and a third coil wound about the core, the third coil located in a third plane that is different than the first and second planes. The sensor being configured to determine at least two vector components of an electromagnetic field at a particular point. The apparatus further includes a processor configured to determine, based on the at least two vector components, a direction of a source of the electromagnetic field with respect to the sensor and a distance to the source of the electromagnetic field from the sensor.

According to another aspect, a method for receiving power via an electromagnetic filed at a position is disclosed. The method includes sensing a first signal indicative of a strength of the electromagnetic field, the first signal corresponding to a first plane of an electromagnetic field at the position, sensing a second signal indicative of a strength of the electromagnetic field, the second signal corresponding to a second plane of the electromagnetic field at the position, the second plane being different than the first plane, sensing a third signal indicative of a strength of the electromagnetic field, the third signal corresponding to a third plane of the electromagnetic field at the position, the third plane being different than the first plane and the second plane, determining at least two vector components of the electromagnetic field at the position based on the first signal, the second signal, and the third signal, and determining, based on the at least two vector components, a direction of the source of electromagnetic field with respect to the sensor and a distance to the source of the electromagnetic field from the sensor.

According to another aspect, an apparatus for receiving power via an electromagnetic filed having an electromagnetic flux at a position is disclosed. The apparatus includes means for sensing a first signal indicative of a strength of the electromagnetic field, the first signal corresponding to a first plane of an electromagnetic field at the position, means for sensing a second signal indicative of a strength of the electromagnetic field, the second signal corresponding to a second plane of the electromagnetic field at the position, the second plane being different than the first plane, means for sensing a third signal indicative of a strength of the electromagnetic field, the third signal corresponding to a third plane of the electromagnetic field at the position, the third plane being different than the first plane and the second plane, means for determining at least two vector components of the electromagnetic field at the position based on the first signal, the second signal, and the third signal, and means for determining, based on the at least two vector components, a direction of the source of the electromagnetic field with respect to the sensor and a distance to the source of the electromagnetic field from the sensor.

For purposes of summarizing the disclosure, certain aspects, advantages and novel features of the inventions have been described herein. It is to be understood that not necessarily all such advantages may be achieved in accordance with any particular embodiment. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIGS. 14A-14D illustrate examples of mechanical alignment using an eccentrically rotatable and vertically movable antenna installed at the underside of a BEV at a suitable position.

FIGS. 15A-15C illustrate a method of guidance and alignment based on the concept of an eccentrically rotatable BEV antenna.

FIGS. 16A-16B illustrate various alignment geometries between BEV and CB antennas.

FIG. 17 illustrates a multidimensional sensor configured for detecting a direction of a beacon signal according to some embodiments.

FIGS. 20A-20C illustrate mapping of direction and position information for displaying during the different phases of parking in the case of forward parking.

FIGS. 21A-21C illustrate mapping of direction and position information for displaying during the different phases of parking in the case of reverse parking.

FIGS. 22A-22D illustrate mapping and displaying of guidance and alignment information during the different phases of parking in the case of forward parking based on an eccentrically rotatable BEV antenna.

FIGS. 23A-23D illustrate mapping and displaying of guidance and alignment information during the different phases of parking in the case of reverse parking based on an eccentrically rotatable BEV antenna.

DETAILED DESCRIPTION

The detailed description set forth below in connection with the appended drawings is intended as a description of various example embodiments and is not intended to represent the only embodiments that can be practiced. The term "exemplary" used throughout this description means "serving as an example, instance, or illustration," and should not necessarily be construed as preferred or advantageous over other embodiments. The detailed description includes specific details for the purpose of providing a thorough understanding of the embodiments. It will be apparent to those skilled in the art that the embodiments may be practiced without these specific details. In some instances, well-known structures and devices are shown in block diagram form in order to avoid obscuring the novelty of the embodiments presented herein.

The term "wireless power" is used herein to mean any form of energy associated with electric fields, magnetic fields, electromagnetic fields, or otherwise that is transmitted between a transmitter and a receiver without the use of physical electrical conductors. Hereafter, all three of these will be referred to generically as radiated fields or wireless fields, with the understanding that pure magnetic or pure electric fields do not radiate power. The term antenna as used herein refers to a structure for transmitting and receiving a signal. In some implementations, an antenna includes an inductive coil. wrapped around a core. In other implementations, an antenna includes an inductive coil that is configured as an air-loop antenna.

Moreover, the term "wireless charging" is used herein to mean providing wireless power to one or more electrochemical cells or systems including electrochemical cells for the purpose of recharging the electrochemical cells.

The term "battery electric vehicle" (BEV) is used herein to mean a remote system, an example of which is a vehicle that includes, as part of its locomotion capabilities, electrical power derived from one or more rechargeable electrochemical cells. As non-limiting examples, some BEVs may be hybrid electric vehicles that include on-board chargers that use power from vehicle deceleration and traditional motors to charge the vehicles. Other BEVs may draw all locomotion ability from electrical power. Other "remote systems" are contemplated including electronic devices and the like.

By way of example and not limitation, a remote system is described herein in the form of a battery electric vehicle (BEV). Other examples of remote systems are also contemplated including various electronic devices and the like capable of receiving and transferring wireless power.

Figure 1:
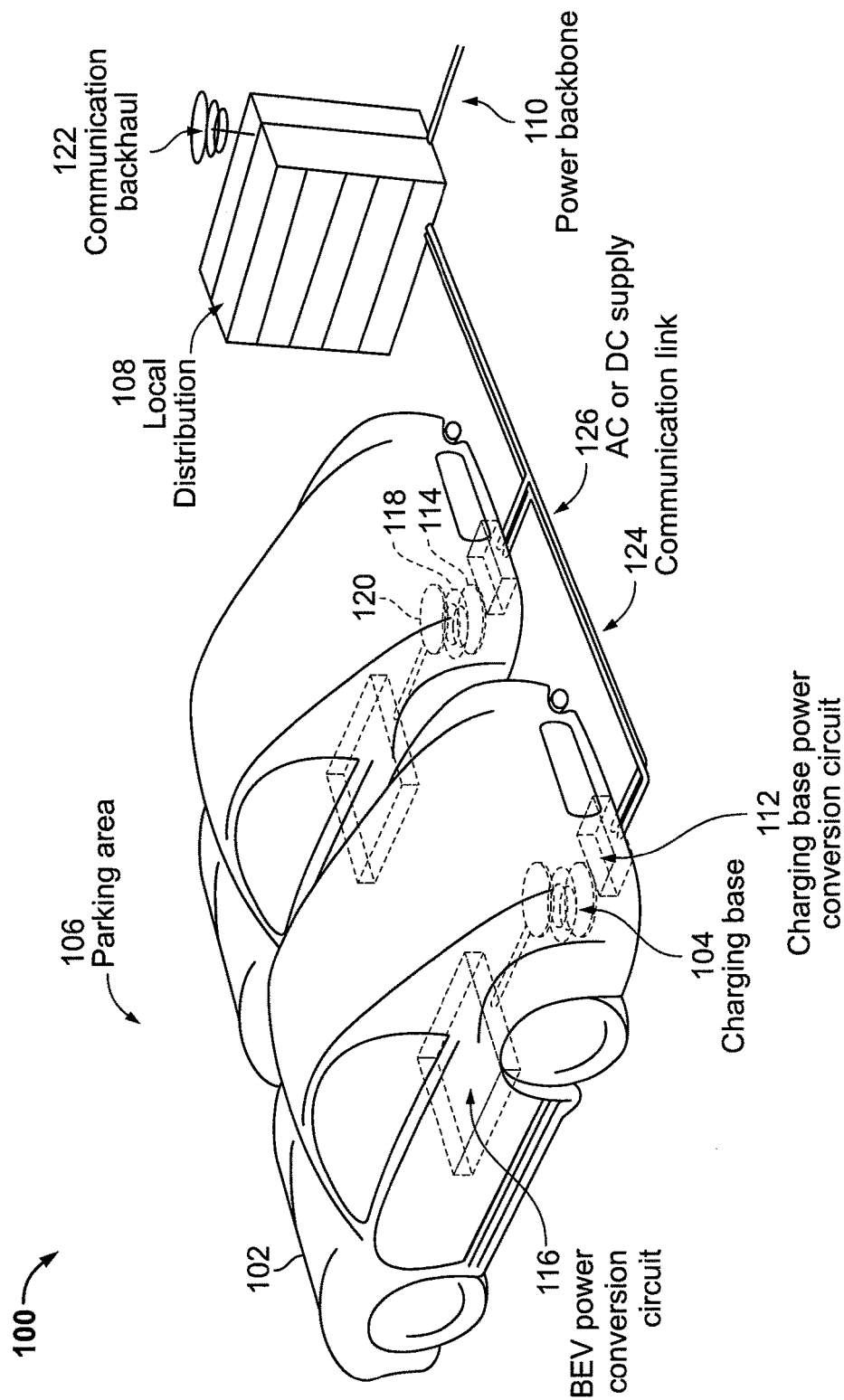
FIG. 1 illustrates a wireless charging system for remote systems such as BEVs equipped with a wireless receiver while the BEV is parked near a wireless transmitter.

FIG. 1 illustrates a wireless charging system for wireless charging enabled remote systems such as a BEV 102 while the BEV 102 is parked near a wireless charging base (CB) 104. Two BEVs 102 are illustrated in parking areas 106 and parked over corresponding CBs 104. A local distribution center 108 may be connected to a power backbone 110 and configured to provide an alternating current (AC) or a direct current (DC) supply through a power source 126 to a charging base power conversion circuit 112 coupled to the charging base 104. The charging base 104 also includes a charging base (CB) antenna 114 for generating a magnetic or electromagnetic near field or receiving or transferring wireless power. Each BEV 102 includes batteries (not shown), a BEV base 120, a BEV power conversion circuit 116 and a BEV antenna 118 interacting with the CB antenna 114, for example, via the near-field of the electromagnetic field generated by one of the CB antenna 114 and the BEV antenna 118.

Local distribution 118 may be configured to communicate with external sources (e.g. a power grid) via a communication backhaul 122, and with the charging base 104 via a communication link 124.

In some embodiments the BEV antenna 118 may be aligned with the CB antenna 114 and, therefore, disposed within the near-field region simply by the driver positioning the vehicle correctly relative to the CB antenna 114. In other embodiments, the driver may be given visual feedback, auditory feedback, or combinations thereof to determine when the vehicle is properly placed for wireless power transfer. In yet other embodiments, the vehicle may be positioned by an autopilot system, which may move the vehicle back and forth (e.g., in zig-zag movements) until an alignment error has reached a tolerable value. This may be performed automatically and autonomously by the vehicle without or with only minimal driver intervention provided that the vehicle is equipped with a servo steering wheel, ultrasonic sensors, and intelligence to adjust the vehicle. In still other embodiments, the receive antenna 118, the CB antenna 114, or a combination thereof may include means for displacing and moving the antennas relative to each other to more accurately orient them and develop more efficient coupling therebetween.

The charging base 104 may be located in a variety of locations. As non-limiting examples, some suitable locations are a parking area 106 at a home of the vehicle owner, parking areas 106 reserved for BEV wireless charging modeled after conventional petroleum-based filling stations, and parking lots at other locations such as shopping centers and places of employment.

BEV charging stations may provide numerous benefits. For example, charging can be performed automatically, virtually without driver intervention and manipulations thereby improving convenience to a user. There may also be no exposed electrical contacts and no mechanical wear out, thereby improving reliability of the power charging system. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, BEVs 102 may be used as distributed storage devices to stabilize a power grid. Therefore, availability of power can be increased with a convenient docking-to-grid solution enabling vehicle to grid (V2G) capability.

A wireless power charging system may also provide aesthetical and non-impedimental advantages. For example, there may be no column loads and cables that may be impedimental for vehicles and/or pedestrians.

As a further explanation of the V2G capability, the wireless power transmit and receive capabilities can be configured to be reciprocal such that the charging base 104 transfers power to the BEV 102 and the BEV 102 transfers power to the charging base 104. This capability may be useful for power distribution stability by allowing BEVs to contribute power to the overall distribution system. This system may be similar to or in addition to solar-cell power systems which are connected to the power grid for supplying excess power to the power grid.

Figure 2:
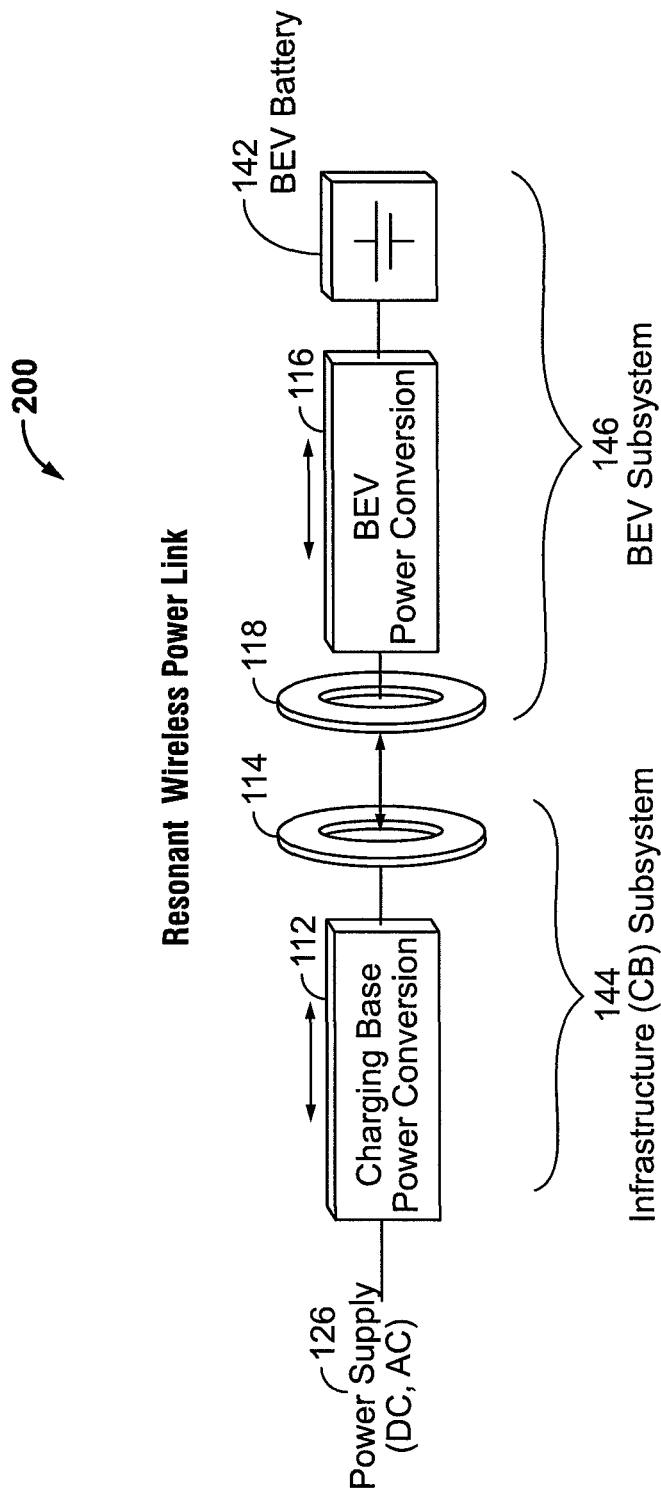
FIG. 2 is a simplified block diagram of a wireless power charging system for a BEV.

FIG. 2 is a simplified block diagram of a wireless power charging system 200 for a BEV. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonance frequency. The method is also known as "magnetic coupled resonance," "electromagnetic coupled resonance," and/or "resonant induction." The operation of the wireless power system 200 will be described based on power transfer from a charging base 104 to a BEV 102, but is not limited thereto. For example, as discussed above, the BEV 102 may transfer power to the charging base 104.

With reference to FIG. 2, a power supply 126, which may be AC or DC, supplies power to the CB power conversion circuit 112 to transfer energy to a vehicle. The CB power conversion circuit 112 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The CB power conversion circuit 112 drives the CB antenna 114 to emit an electromagnetic field at a desired frequency. If the CB antenna 114 and BEV antenna 118 are tuned to substantially the same frequencies and are close enough to be within the near-field of an electromagnetic field transmitted by one of the CB antenna 114 and the BEV antenna 118, the CB antenna 114 and BEV antenna 118 become coupled to one another such that power may be transferred to the BEV antenna 118 and extracted in the BEV power conversion circuit 116. The BEV power conversion circuit 116 may include, among other things, a LF/DC converter configured to convert power at an operating frequency back to DC power at a voltage level matched to the voltage level of a BEV battery unit 142. The BEV power conversion circuit 116 may then charge the BEV battery unit 142. The power supply 126, CB power conversion circuit 112, and CB antenna 114 are included in the infrastructure subsystem 144 of an overall wireless power system 200, which may be stationary and located at a variety of locations as discussed above. The BEV battery unit 142, BEV power conversion circuit 116, and BEV antenna 118 are included in a BEV wireless power subsystem 146 that is part of BEV 102 or part of the battery pack. The BEV subsystem 146 may also be configured to provide power wirelessly through the BEV antenna 118 to the infrastructure subsystem 144 to store power to the grid. Each of the BEV antenna 118 and the CB antenna 114 may act as transmit or receive antennas based on the mode of operation.

While not shown, the wireless power system 200 may include a load disconnect unit (LDU) to safely disconnect the BEV battery unit 142 or the charging base 104 from the wireless charging system 200. For example, in case of an emergency or system failure, the LDU may be triggered to disconnect the load from the wireless power system 200. The LDU may be provided in addition to a battery management system for managing charging to a battery.

Further, BEV circuitry may include switching circuitry for connecting and disconnecting the BEV antenna 118 to the BEV power conversion circuit 116. Disconnecting the BEV antenna 118 not only suspends charging, but also changes the "load" as "seen" by the charging base 104 (acting as a transmitter), which can be used to "cloak" the BEV base 120 (acting as the receiver) from the charging base 104. The load changes can be detected if the transmitter includes the load sensing circuit. Accordingly, the transmitter, such as a charging base 104, may have a mechanism for determining when receivers, such as a BEV base 120, are present in the near-field of the CB antenna 114.

In operation, assuming energy transfer towards the vehicle or battery, input power is provided from the power supply 126 such that the CB antenna 114 generates a radiated field for providing the energy transfer. The BEV antenna 118 couples to the radiated field and generates output power for storage or consumption by the vehicle, such as a BEV 102. In some embodiments, the CB antenna 114 and BEV antenna 118 are configured according to a mutual resonant relationship such that when the resonant frequency of the BEV antenna 118 and the resonant frequency of the CB antenna 114 are very close. Transmission losses between the infrastructure subsystem 144 and BEV wireless power subsystem 146 are minimal when the BEV antenna 118 is located in the near-field of the CB antenna 114.

As stated, an efficient energy transfer occurs by coupling a large portion of the energy in the near-field of a transmitting antenna to a receiving antenna rather than propagating most of the energy in an electromagnetic wave to the far-field. When in the near-field, a coupling mode may be established between the transmit antenna and the receive antenna. The area around the antennas where this near-field coupling may occur is referred to herein as a near field coupling-mode region.

While not shown, the CB power conversion circuit 112 and the BEV power conversion circuit 116 may both include an oscillator, a power amplifier, a filter, and a matching circuit for efficient coupling with the wireless power antenna. The oscillator may be configured to generate a desired frequency, which may be adjusted in response to an adjustment signal. The oscillator signal may be amplified by the power amplifier with an amplification amount responsive to control signals. The filter and matching circuit may be included to filter out harmonics or other unwanted frequencies and match the impedance of the power conversion module to the wireless power antenna. The CB and BEV power conversion circuits may also include, a rectifier, and switching circuitry to generate a suitable power output to charge the battery.

BEV antenna 118 and CB antenna 114 as described throughout the disclosed embodiments may be configured as "loop" antennas, and more specifically, multi-turn loop antennas, which may also be referred to herein as "magnetic" antennas. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near-field of the transmitting antenna to the receiving antenna residing within a region (e.g. within a predetermined frequency range of the resonant frequency, or within a predetermined distance of the near-field region) where this near-field is established rather than propagating the energy from the transmitting antenna into free space.

The resonant frequency of the antennas is based on the inductance and capacitance of the circuit. Inductance in a loop antenna is generally the inductance created by the loop, whereas, capacitance is generally added to the loop antenna's inductance to create a resonant structure at a desired resonant frequency. As a non-limiting example, a capacitor may be added in series with the antenna to create a resonant circuit that generates an electromagnetic field. Accordingly, for larger diameter loop antennas, the value of capacitance needed to induce resonance decreases as the diameter or inductance of the loop increases. Inductance may also depend on a number of turns of a loop antenna. Furthermore, as the diameter of the loop antenna increases, the efficient energy transfer area of the near-field increases. Other resonant circuits are possible. As another non-limiting example, a capacitor may be placed in parallel between the two terminals of the loop antenna (e.g., a parallel resonant circuit).

According to some embodiments, coupling power between two antennas that are in the near-field of one another is disclosed. As stated, the near-field is an area around the antenna in which electromagnetic fields exist but may not propagate or radiate away from the antenna. Near-field coupling-mode regions may correspond to a volume that is near the physical volume of the antenna, e.g. within a radius of one sixth of the wavelength. According to some embodiments, electromagnetic antennas, such as single and multi-turn loop antennas, are used for both transmitting and receiving since magnetic near-field amplitudes in practical embodiments tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas may be used.

Figure 3:
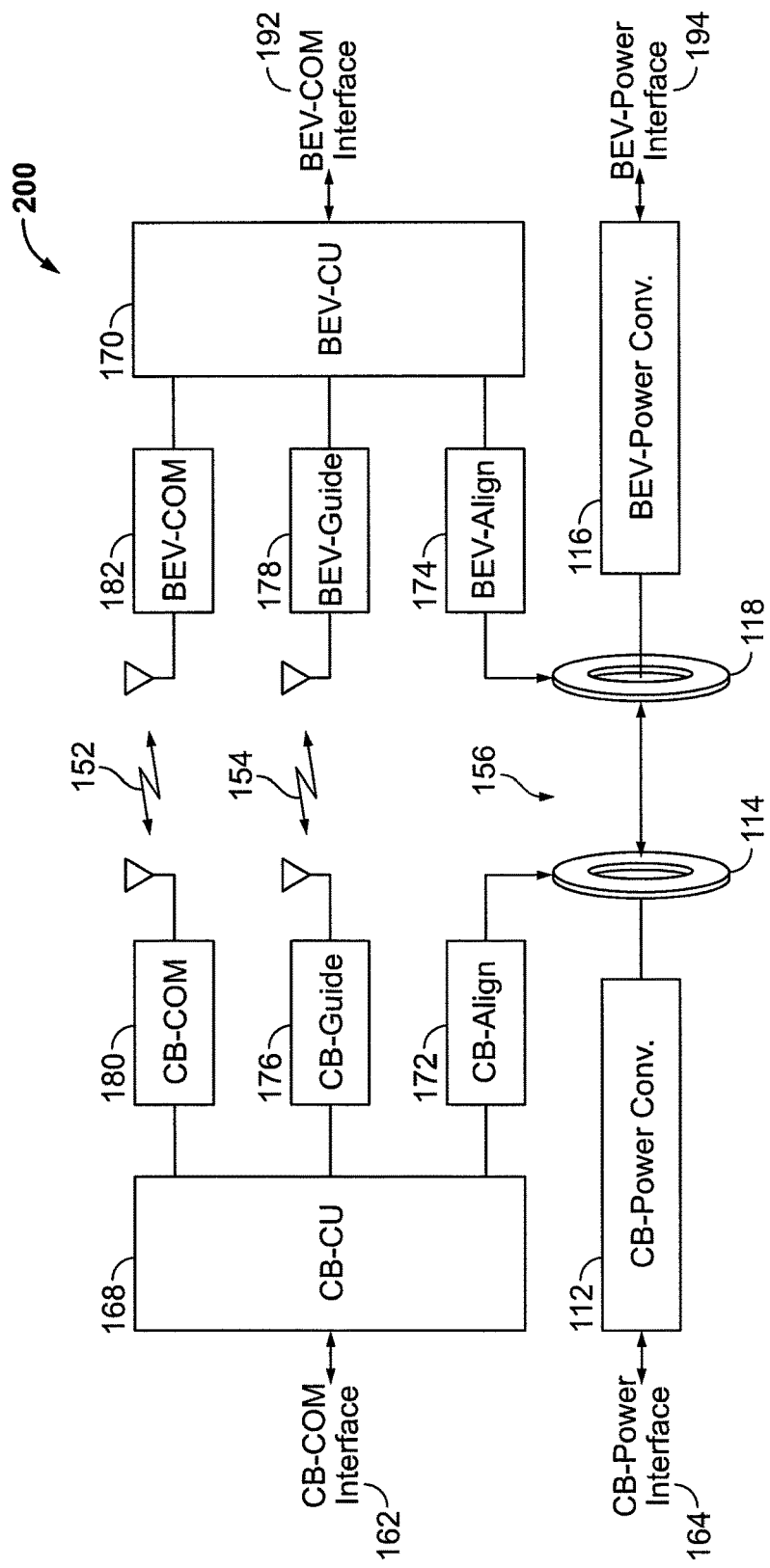
FIG. 3 is a more detailed block diagram of a wireless power charging system for a BEV illustrating communication links, guidance links, and alignment systems for the transmit antenna and receive antenna.

FIG. 3 is a more detailed block diagram of a wireless power charging system 200 for a BEV illustrating communication links 152, guidance links 154, and alignment systems 156 for the CB antenna 114 and BEV antenna 118. As with the embodiment of FIG. 2, and assuming energy flow towards the BEV 102, in FIG. 3 a CB power interface 164 may be configured to provide power to a CB power conversion circuit 112 from a power source, such as an AC or DC power supply 126. The CB power conversion circuit 112 receives AC or DC power from the CB power interface 164 and excites the CB antenna 114 at or near its resonant frequency. The BEV antenna 118, when in the near field coupling-mode region, receives energy from the near field coupling mode region to oscillate at or near the resonant frequency. The BEV power conversion circuit 116 converts the oscillating signal from the BEV antenna 118 to a power signal suitable for charging a battery through the BEV power interface 194.

The system may also include a CB control unit 168 and a BEV control unit 170. The CB control unit 168 may include a communication interface 162 to other systems (not shown) such as, for example, a computer, and a power distribution center, or a smart power grid. The BEV control unit 170 may include a communication interface 192 to other systems (not shown) such as, for example, an on-board computer on the vehicle, other battery charging controller, other electronic systems within the vehicles, and remote electronic systems.

The CB control unit 168 and BEV control unit 170 may include subsystems or modules for specific application with separate communication channels therefore. These communications channels may be separate physical channels or separate logical channels. As non-limiting examples, a CB alignment module 172 may communicate with a BEV alignment module 174 through a communication link 152 to provide a feedback mechanism for more closely aligning the CB antenna 114 and BEV antenna 118, either autonomously or with operator assistance. Similarly, a CB guidance module 176 may communicate with a BEV guidance module 178 through a guidance link to provide a feedback mechanism to guide an operator in aligning the CB antenna 114 and BEV antenna 118. In addition, there may be a separate general-purpose communication links (e.g. channels) supported by CB communication unit 180 and BEV communication unit 182 for communicating other information between the CB and the BEV. This information may include information about BEV characteristics, battery characteristics, charging status, and power capabilities of both the CB and the BEV, as well as maintenance and diagnostic data. These communication channels may be separate physical communication channels such as, for example, Bluetooth, zigbee, cellular, etc.

BEV control unit 170 may also include a battery management system (BMS) that manages charge and discharge of the BEV 102 principal battery, parking assistance system based on microwave or ultrasonic radar principles, a brake system configured to perform a semi-automatic parking operation, and a steering wheel servo system configured to assist with a largely automated parking 'Park by wire' that may provide higher parking accuracy, thus reducing the need for mechanical horizontal antenna alignment in any of the CB and the BEV subsystem. Further, BEV control unit 170 may be configured to communicate with electronics of the BEV 102. For example, BEV control unit 170 may be configured to communicate with visual output devices (e.g. a dashboard display), acoustic/audio output devices (e.g. buzzer, speakers); mechanical input devices (e.g. keyboard, touch screen, and pointing devices such as joystick, trackball, etc.), and audio input devices (e.g. microphone with electronic voice recognition).

Furthermore, the wireless power system 200 may include detection and sensor systems. For example, the wireless power system 200 may include sensor for use with systems to properly guide the driver or the vehicle to the charging spot, sensors to mutually align the antennas with the required separation/coupling and to detect objects that may obstruct the BEV antenna 118 from moving to a particular height and/or position to achieve coupling, and safety sensors for use with systems to perform a reliable, damage free, and safe operation of the system. For example, a safety sensor may include a sensor for detection of presence of animals or children approaching the wireless power antennas beyond a safety radius, detection of metal objects near the CB antenna 114 that may be heated up (induction heating), detection of hazardous events such as incandescent objects on the CB antenna 114 and temperature monitoring of the CB and BEV subsystem components.

The wireless power system 200 may also support corded (plug-in) charging. A wired charge port may integrate the outputs of the two different chargers prior to transferring power to or from the BEV 102. Switching circuits may provide the functionality to support both cordless charging and charging via a wired charge port.

To communicate between a charging base 104 and a BEV 102, the wireless power system 200 may use both in-band signaling and an RF data modem (e.g. Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimum interference.

In addition, some communication may be performed via the wireless power link without using specific communications antennas. For example, the wireless power antennas may also be configured to act as wireless communication antennas. Thus, some embodiments of the CB may include a controller (not shown) for enabling keying type protocol on the wireless power path. By keying the transmit power level (amplitude shift keying) at predefined intervals with a predefined protocol, the receiver can detect a serial communication from the transmitter. The CB power conversions module 162 may include a load sensing circuit (not shown) for detecting the presence or absence of active BEV receivers in the vicinity of the near-field generated by the CB antenna 114. By way of example, a load sensing circuit monitors the current flowing to the power amplifier, which is affected by the presence or absence of active receivers in the vicinity of the near-field generated by CB antenna 114. Detection of changes to the loading on the power amplifier may be monitored by the controller for use in determining whether to enable the oscillator for transmitting energy, to communicate with an active receiver, or a combination thereof.

To enable wireless high power transfer, some embodiments may be configured to transfer power at a frequency in the range from 20-60 kHz. This low frequency coupling may allow highly efficient power conversion that can be achieved using solid state devices. In addition, there may be less coexistence issues with radio systems compared to other bands.

Figure 4:
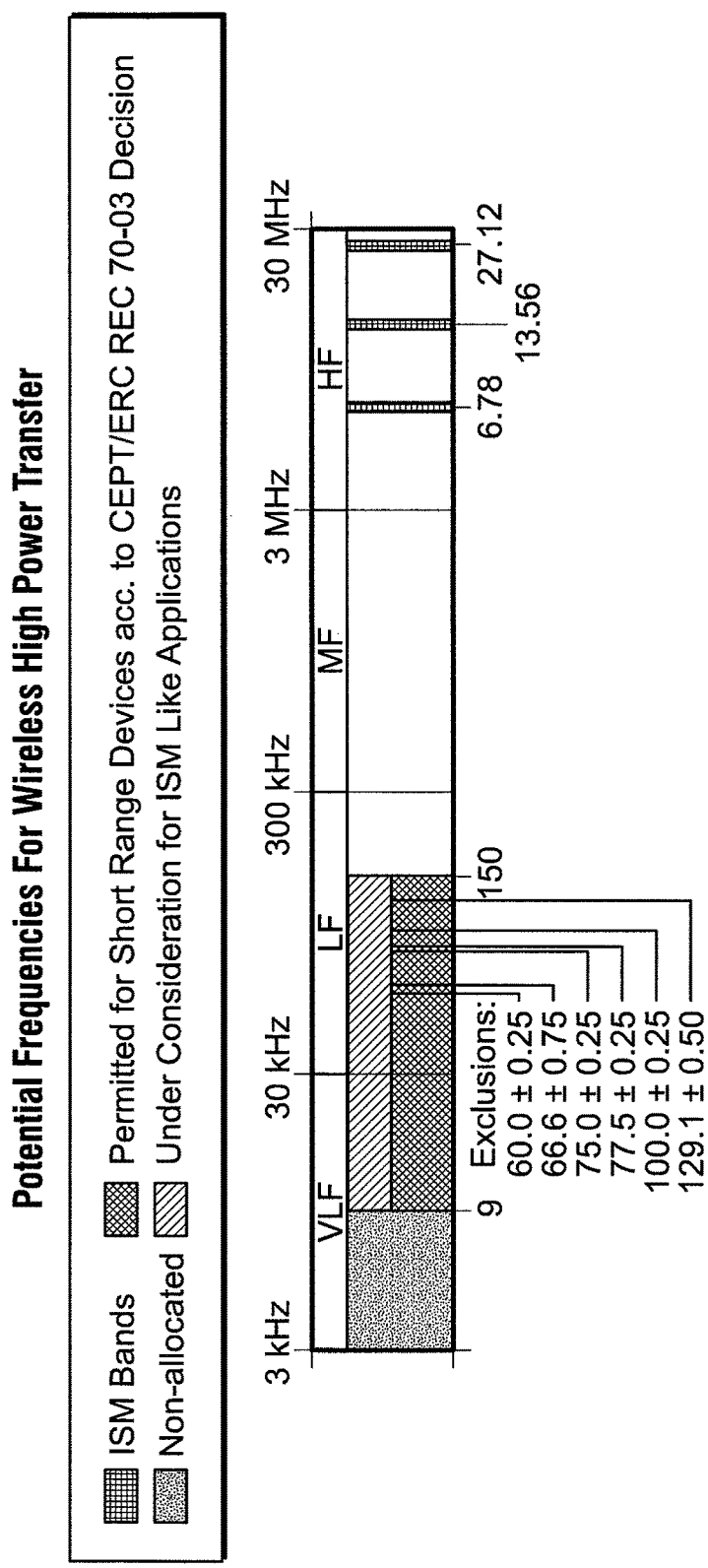
FIG. 4 illustrates a frequency spectrum showing various frequencies that may be available for wireless charging of BEVs.

FIG. 4 illustrates a frequency spectrum showing various frequencies that may be available and suitable for wireless charging of BEVs. Some potential frequency ranges for wireless high power transfer to BEVs include: very low frequency (VLF) in a 3 kHz to 30 kHz band, low frequency (LF) in a 30 kHz to 150 kHz band, for industrial, scientific, and medical (ISM) like applications, with some exclusions, high frequency (HF) 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 5:
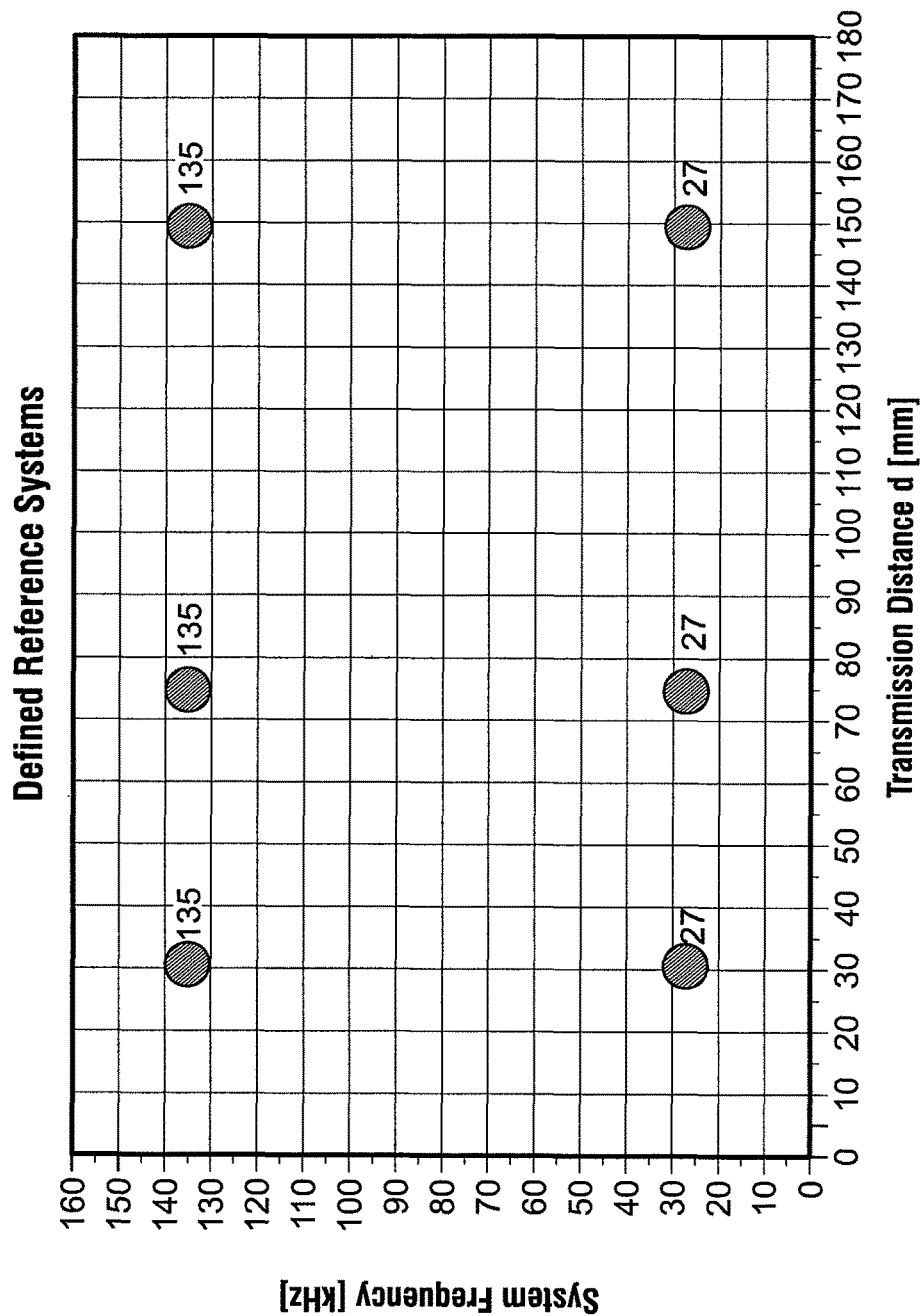
FIG. 5 illustrates some possible frequencies and transmission distances that may be useful in wireless charging of BEVs.

FIG. 5 illustrates some possible frequencies and transmission distances that may be useful in wireless charging of BEVs. Some example transmission distances that may be useful for BEV wireless charging are about 30 mm, about 75 mm, and about 150 mm. Some example frequencies may be about 27 kHz in the VLF band and about 135 kHz in the LF band.

Many considerations should be taken into account on determining a suitable frequency beyond just the resonance characteristics and coupling-mode region of the receive and transmit antennas. Wireless power frequencies may interfere with frequencies used for other applications. As non-limiting examples, there may be VLF/LF coexistence issues with power line frequencies, audible frequencies and communication frequencies. Some non-limiting examples where coexistence may be an issue for VLF and LF are: frequencies for radio controlled clocks, frequencies for LW AM broadcasts and other radio services, cross-coupling to ISDN/ADSL and ISDN/xDSL communication channels, electronic vehicle immobilization systems, RFID (Radio Frequency Identification) systems, EAS (Electronic Article Surveillance) systems, on-site paging, Low Voltage PLC systems, medical implants (cardiac pacemakers, etc.), audio systems and acoustic emission perceivable by humans and animals.

Some non-limiting examples where coexistence may be an issue for HF frequencies are industrial, scientific and medical (ISM) radio bands, such as: 6.78 MHz for remote control applications and RFID in full duplex (FDX) or half duplex (HDX) mode with continuous energy transfer; 13.56 MHz for RFID in FDX or HDX mode with continuous energy transfer as well as portable device wireless power; and 27.12 MHz for Railway applications (Eurobalise 27.095 MHz), Citizen band radio, and remote control (e.g., models, toys, garage door, computer mouse, etc.).

Figure 6:
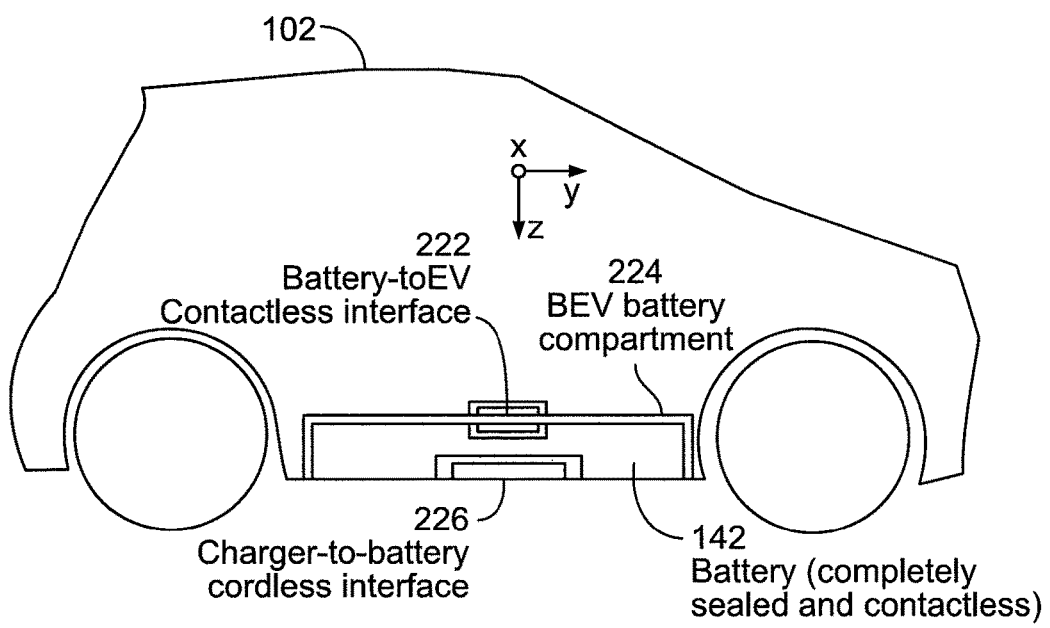
FIG. 6 shows a simplified diagram of a replaceable contactless battery disposed in a BEV.

The wireless power charging system described throughout this disclosure may be used with a variety of BEVs 102 including rechargeable or replaceable batteries. FIG. 6 shows a simplified diagram of a rechargeable and/or replaceable battery disposed in a BEV 102. In this embodiment, the low battery position may be useful for a BEV battery unit 142 that integrates a wireless power interface (e.g. a charger-to-battery cordless interface 226) and that can receive power from a charger embedded in the ground. In FIG. 6, the BEV battery unit 142 may be a rechargeable battery unit, and may be accommodated in a battery compartment 224. The BEV battery unit 142 also provides a wireless power interface 226, which may integrate the entire BEV wireless power subsystem 146 including a resonant antenna, power conversion circuitry, and other control and communications functions as needed for efficient and safe wireless energy transfer between a ground-embedded charging base 104 and the BEV battery unit 142.

It may be useful for the BEV antenna 118 to be integrated flush with a bottom side of BEV battery unit 142 or the vehicle body so that there are no protrusive parts and so that the specified ground-to-vehicle body clearance can be maintained. This configuration may require some room in the BEV battery unit 142 dedicated to the BEV wireless power subsystem 146.

In some embodiments, the CB antenna 114 and the BEV antenna 118 are fixed in position and the antennas are brought within a near-field coupling region by overall placement of the BEV base 120 relative to the charging base 104. However, in order to perform energy transfer rapidly, efficiently, and safely, the distance between the CB antenna 114 and the BEV antenna 118 may be reduced to improve coupling. Thus, in some embodiments, the CB antenna 114 and/or the BEV antenna 118 may be deployable and/or moveable to bring them into better alignment. The BEV battery unit 222 may also include a battery-to-EV cordless interface 222, and a charger-to-battery cordless interface 226 that provides contactless power and communication between the BEV 102 and a charging base 104.

Figure 7A:
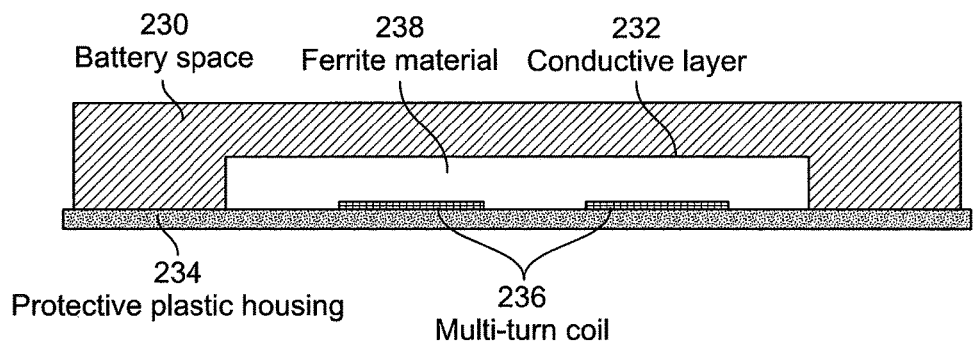
FIGS. 7A-7D are more detailed diagrams of a wireless power antenna and ferrite material placement relative to a battery.

FIGS. 7A-7D are more detailed diagrams of a wireless power antenna base (e.g. BEV base 120) and ferrite material placement relative to a battery. FIG. 7A shows a fully ferrite embedded induction coil 236. The wireless power antenna may include a ferrite material 238 and an induction coil 236 wound about the ferrite material 238. The induction coil 236 itself may be made of stranded Litz wire. A conductive shield 232 may be provided to protect passengers of the vehicle from excessive EMF transmission. Conductive shielding may be particularly useful in vehicles made of plastic or composites.

Figure 7B:
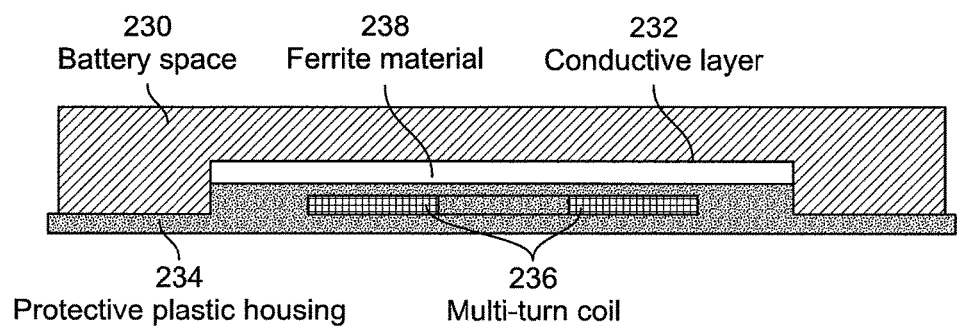

FIG. 7B shows an optimally dimensioned ferrite plate (i.e., ferrite backing) to enhance coupling and to reduce eddy currents (heat dissipation) in the conductive shield 232. The induction coil 236 may be fully embedded in a non-conducting non-magnetic (e.g. plastic) material. For example, as illustrated in FIG. 7A-7D, the induction coil 236 may be embedded in a protective housing 234. There may be a separation between the induction coil 236 and the ferrite material 238 as the result of an trade-off between magnetic coupling and ferrite hysteresis losses.

Figure 7C:
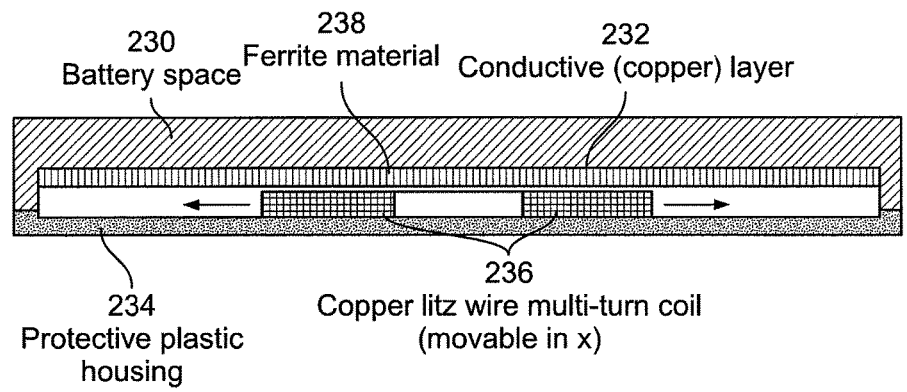
Figure 7D:
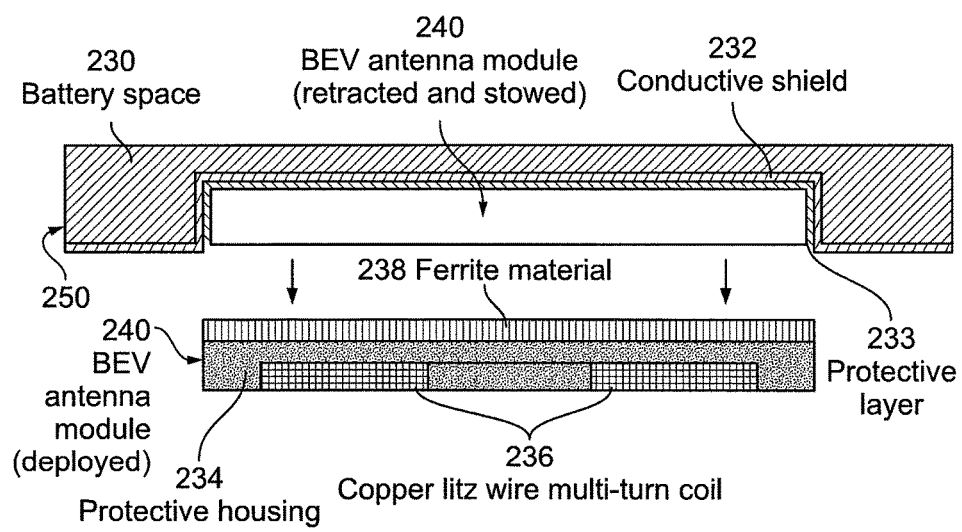

FIG. 7C illustrates another embodiment wherein the induction coil 236 (e.g. a copper Litz wire multi-turn coil) may be movable in a lateral ("x") direction. FIG. 7D illustrates another embodiment where only the antenna (coil) module is deployed in a downward direction. In some embodiments, the battery unit includes one of a deployable and non-deployable BEV antenna module 240 as part of the wireless power interface. To prevent magnetic fields from penetrating into the battery space 230 and into the interior of the vehicle, there may be a conductive shield 232 (e.g., a copper sheet) between the battery space 230 and the vehicle. Furthermore, a non-conductive (e.g., plastic) protective layer 233 may be used to protect the conductive shield 232, the induction coil 236, and the ferrite material 238 from environmental impacts (e.g., mechanical damage, oxidization, etc.). Furthermore, the induction coil 236 may be movable in lateral X and/or Y directions. FIG. 7D illustrates an embodiment wherein the BEV antenna module 240 is deployed in a downward Z direction relative to a battery unit body 250.

The design of this deployable BEV antenna module 240 is similar to that of FIG. 7B except there is no conductive shielding at the BEV antenna module 240. The conductive shield 232 stays with the battery unit body 250. The protective layer 233 (e.g. plastic layer) is provided between the conductive shield 232 and the BEV antenna module 240 when the BEV antenna module 240 is not in a deployed state. The physical separation of the BEV antenna module 240 from the battery unit body 250 has a positive effect on the antenna's performance.

As discussed above, the BEV antenna module 240 that is deployed may contain only the induction coil 236 (e.g. Litz wire) and ferrite material 238. Ferrite backing may be provided to enhance coupling and to prevent from excessive eddy current losses in a vehicle's underbody or in the conductive shield 232. Moreover, the BEV antenna module 240 may include a flexible wire connection to power conversion electronics and sensor electronics. This wire bundle may be integrated into the mechanical gear for deploying the BEV antenna module 240.

Figure 8:
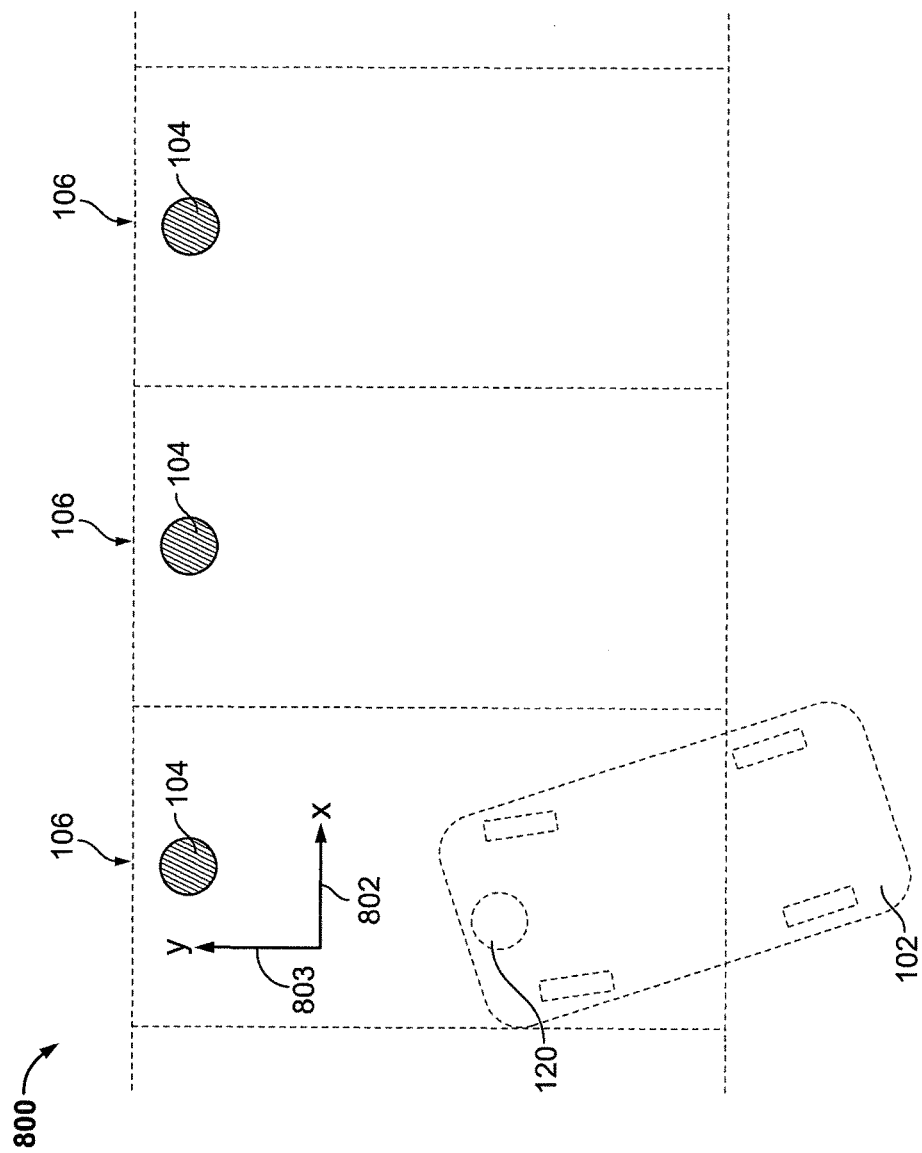
FIG. 8 illustrates a parking lot including a plurality of parking areas and a charging base positioned within each parking area, in accordance with an embodiment.

The charging systems described above may be used in a variety of locations for charging a BEV 102, or transferring power back to a power grid. For example, the transfer of power may occur in a parking lot environment. FIG. 8 illustrates a parking lot 800 including a plurality of parking areas 106. It is noted that a "parking area" may also be referred to herein as a "parking space." To enhance the efficiency of a vehicle wireless charging system, a BEV 102 may be aligned along an X direction (depicted by arrow 802 in FIG. 8) and a Y direction (depicted by arrow 803 in FIG. 8) to enable a BEV base 120 within the BEV 102 to be adequately aligned with a charging base 104 within an associated parking area 106. Although parking areas 107 in FIG. 8 are illustrated as having a single charging base 104, the parking areas 107 may also include multiple CBs 104.

Furthermore, the disclosed embodiments are applicable to parking lots 800 having one or more parking spaces or parking areas 106, wherein at least one parking space within a parking lot may comprise a charging base 104. Guidance systems (not shown) may be used to assist a vehicle operator in positioning a BEV 102 in a parking area 106 to align a BEV base 120 within the BEV 102 with a charging base 104. Guidance systems may include electronic-based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting a BEV operator in positioning a BEV 102 to enable an antenna within the BEV 102 to be adequately aligned with a charging antenna within a charging base (e.g., charging base 104).

As discussed above, the BEV wireless power subsystem 146 may be placed on the underside of the BEV 102 for transmitting and receiving power from a charging base 104. For example, a BEV antenna 118 may be integrated into the vehicles underbody preferably near a center position providing maximum safety distance in regards to EM exposure and permitting forward and reverse parking of the BEV.

In order to achieve maximum power under regulatory and human exposure constraints (EM field strength limits) and transfer efficiencies comparable to wired charging solutions, the air gap between CB and BEV antenna may be set as small as possible. However the air gap cannot be reduced e.g. simply by a 'low-slung' BEV antenna 118 since vehicles should provide a certain minimum chassis-ground clearance. Minimum ground clearance may depend on the vehicle category (city car, off-road vehicle, etc.) and may be manufacturer specific or defined by existing standards or recommendations.

Figure 9A:
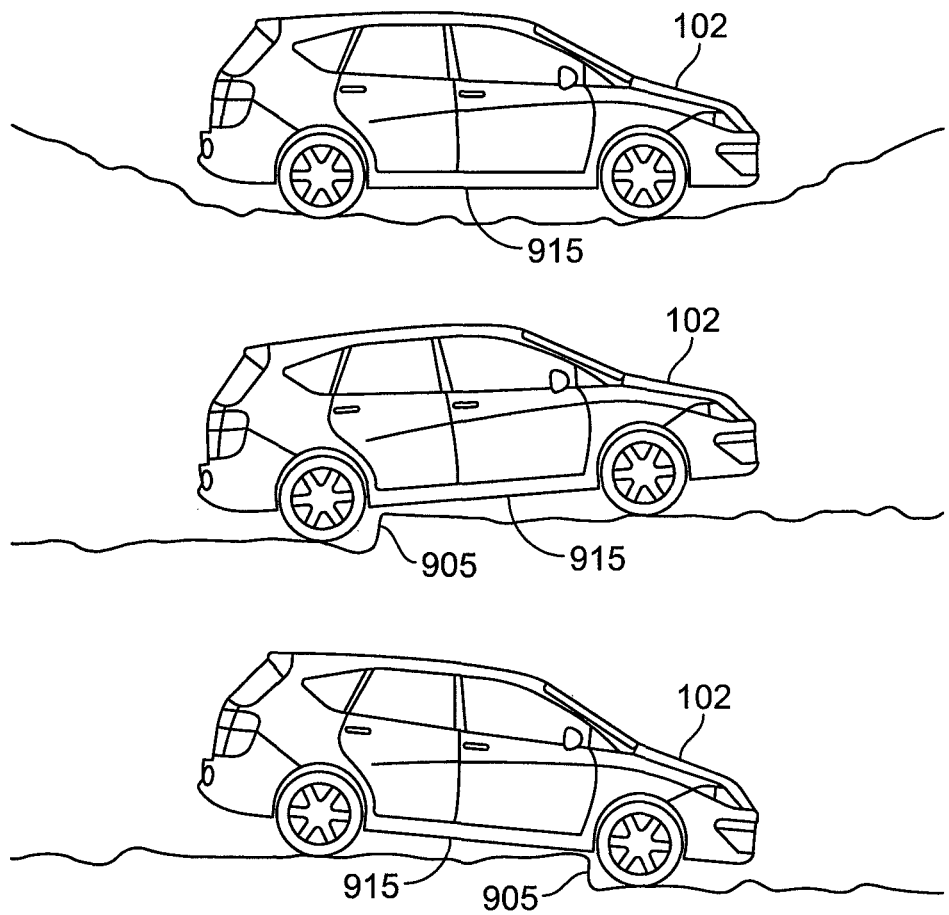
FIG. 9A illustrates an example of the various obstructions that may be encountered by a vehicle, which may require chassis clearance.

The placement of the BEV wireless power subsystem 146 including the BEV antenna 118 on the underside of the BEV 102 may encounter various obstructions during operation or motion of the BEV 102. FIG. 9A illustrates an example of the various obstructions 905 may be encountered by a BEV 102 requiring a minimum chassis clearance. The obstructions 905 may contact the chassis underside 915 of the chassis of the BEV 102 at different locations. When a wireless power antenna (not shown) is located within or near the chassis underside 915 of the chassis of the BEV 102, the wireless power antenna may become damaged, misaligned, or have other problems associated with obstructions 905 contacting the wireless power antenna.

Figure 9B:
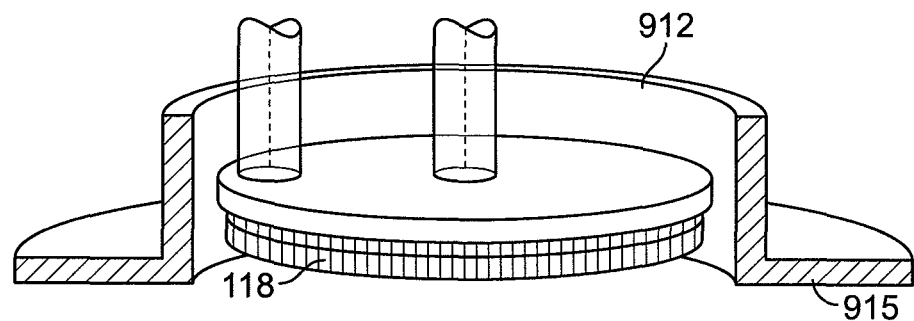
FIG. 9B illustrates a wireless power antenna located within a cavity of the underside of the chassis of a vehicle according to an embodiment.

FIG. 9B illustrates a BEV antenna 118 according to some embodiments. In order to protect the BEV antenna 118 from undesirable contact from obstructions, the BEV antenna 118 may be placed within a cavity 912 of the chassis underside 915 of the BEV 102. As discussed above with reference to FIG. 7D, the BEV antenna 118 may be deployable for transmitting or receiving wireless power from a CB antenna 114.

A mechanically deployable antenna may provide high end-to-end efficiency (e.g. well above 90%), support charge power levels considerably above 3 kW, and cope with any ground clearance requirement that might be specified for a BEV (e.g. >20 cm). A mechanically deployable antenna may also support both ground-embedded and surface mount CB installations, and operate at low emission and exposure levels. The deployable antenna may also compensate for antenna misalignment providing increased tolerance and thus increased parking convenience to the driver as will be discussed in greater detail with reference to FIGS. 11A-11G below.

Antenna separation and thus reduced coupling may also help to suppress antenna current harmonics as generated by switched-mode power conversion. Loosely coupled systems may provide inherent selectivity to attenuate unwanted emission levels at harmonic frequencies. Though antenna currents and field strength may increase by reducing coupling, there is generally a net benefit in reduced harmonics emission levels, which may supersede any supplementary harmonics filtering, reducing circuit complexity and losses.

A charging base 104 may include a power conversion unit operably coupled with a CB antenna 114. The charging base 104 may further include other mechanical or electronic components (e.g., processor) that may be used for position adjustment of the CB antenna 114 as will be described herein. Components of the charging base 104 may be housed within a charging base 104 that is at least partially embedded below a ground surface, such as the ground surface of a parking lot, driveway, or garage.

Figure 10A:
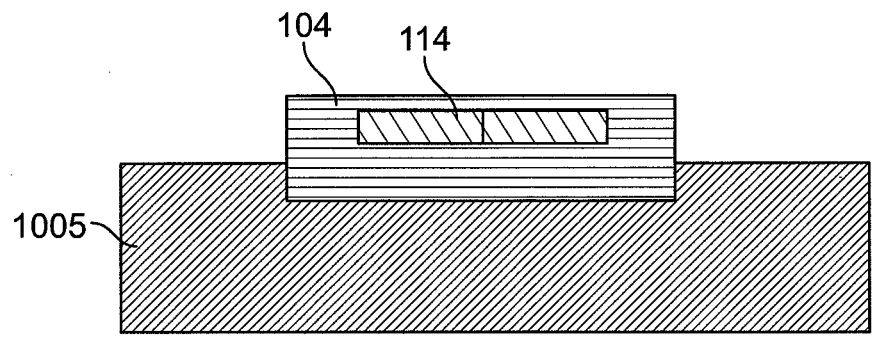
FIGS. 10A-10C illustrate several variants of embedding a charging base according to some embodiments.
Figure 10B:
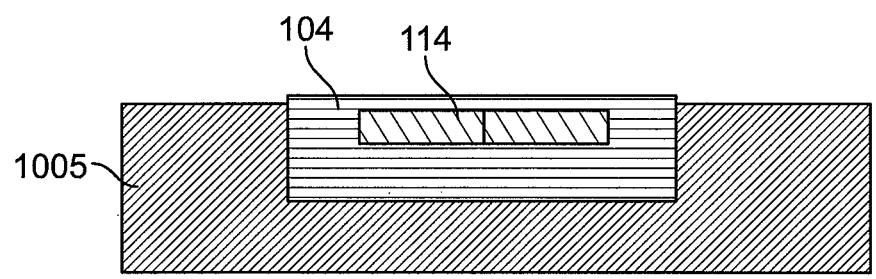
Figure 10C:
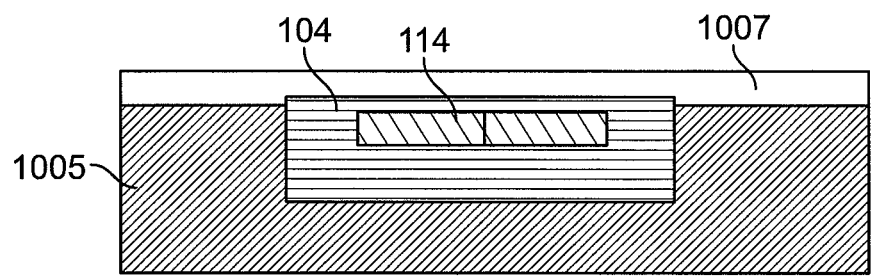
Figure 11A:
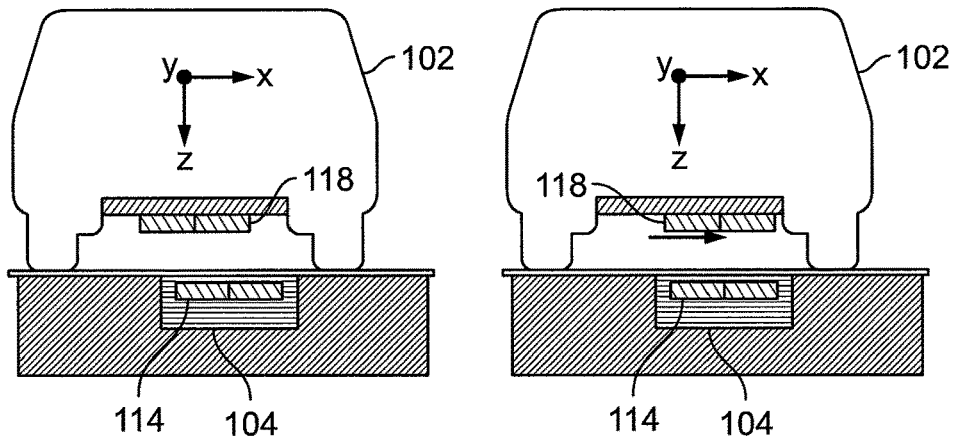
FIGS. 11A-11G illustrate a BEV and a charging base including several variants for fine alignment adjustment according to some embodiments
Figure 11B:
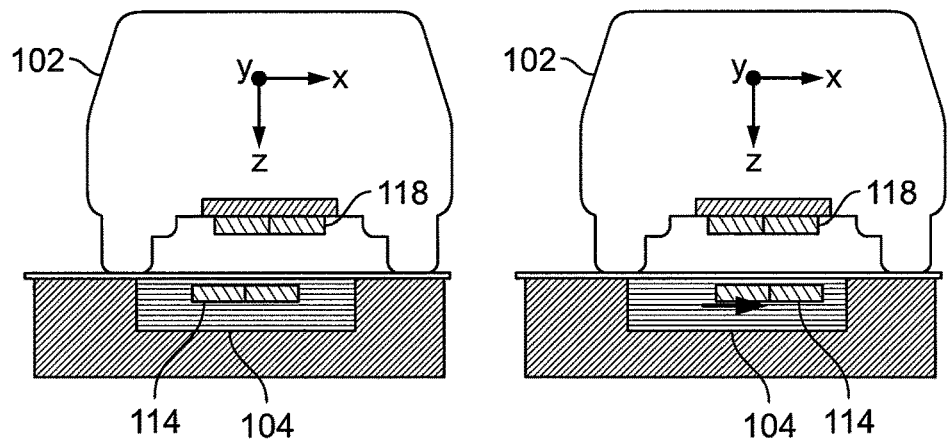
Figure 11C:
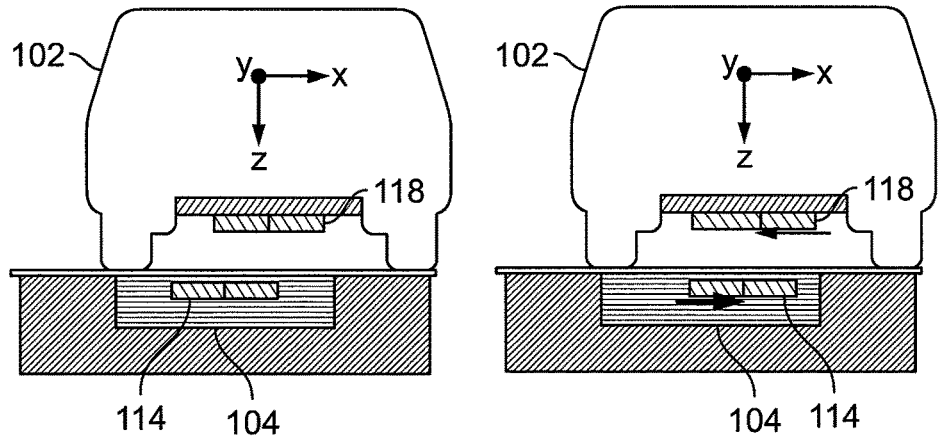
Figure 11D:
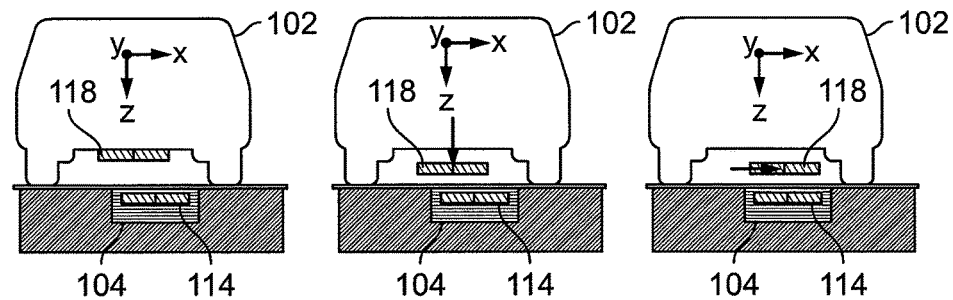
Figure 11E:
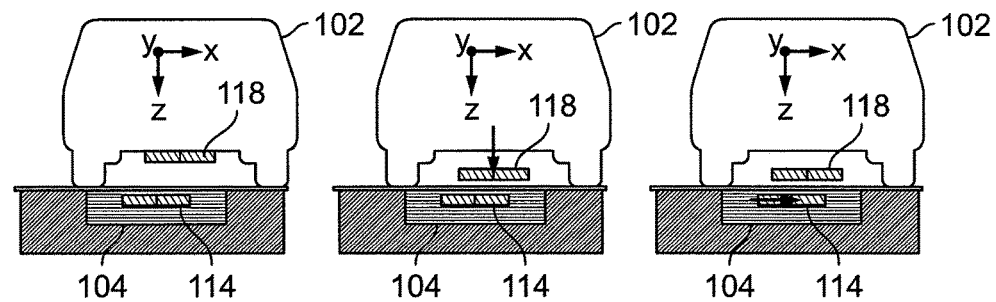
Figure 11F:
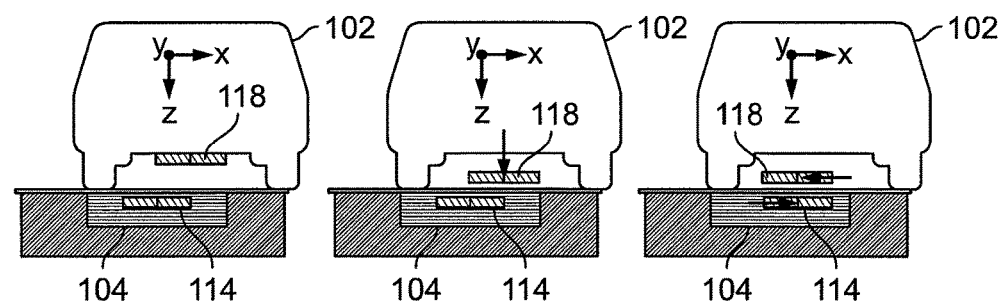
Figure 11G:
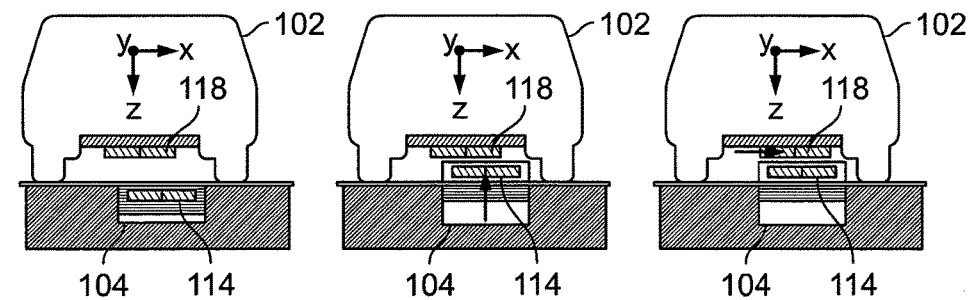

FIGS. 10A-10C illustrate a charging base 104 at least partially embedded below a surface of the ground 1005 according to an some embodiments. The charging base 104 may include one or more CB antennas 114 for transmitting or receiving a wireless power signal to/from a corresponding BEV antenna 118 (not shown) associated with a BEV 102. As illustrated in FIG. 10A, the charging base 104 may be protrusive from a surface of the ground 1005, which may improve coupling as the distance between the CB antenna 114 and BEV antenna 118 may be reduced. A protrusive charging base 104 may be more accessible for maintenance and repair.

Alternatively, as illustrated in FIG. 10B, the charging base 104 may be flush 1102 with the surface of the ground 1005. A flush charging base 104 may be more accessible for maintenance and repair and non-impedimental. However, coupling between the CB antenna 114 and BEV antenna 118 may be reduced in comparison to the protrusive charging base 104 of FIG. 10A.

Alternatively, as illustrated in FIG. 10C, a charging base 104 may be located completely below the surface of the ground 1005 (e.g., below the asphalt layer 1007). Such a below-surface charging base 104 may be more secure from intruders (e.g., vandalism), and be non-impedimental. In a sheltered environment, such as home garages and multistory car parks, a surface mount low profile CB antenna 114 may be used. This is particularly true if ground material is iron reinforced concrete rendering ground embedding difficult and expensive.

Upon positioning a BEV 112 in proximity to a charging base 104, mechanisms may be employed for fine alignment of a BEV antenna 118 with the CB antenna 114 to improve coupling therebetween. FIGS. 11A-11G illustrate a BEV and a charging base include several variants for fine alignment adjustment according to some embodiments. As shown by FIGS. 11A-11G, the physical position of the BEV antenna 118 may be adjusted to correct for alignment errors in the X, Y, and Z directions, or any combination thereof. Additionally, the position of the CB antenna 114 may be adjusted to correct for alignment errors in the X, Y, and Z directions, or any combination thereof. In some embodiments, the positions of both the BEV antenna 118, and the CB antenna 114 may be adjusted to correct for alignment errors in any of the X, Y, and Z directions, or any combination thereof.

During coupling of wireless power between a CB antenna 114 and a BEV antenna 118 associated with a battery unit of a BEV 102, the position of at least one of the CB antenna 114 and the BEV antenna 118 may be adjusted. The adjustment of position may be initiated in response to a detection of misalignment between the CB antenna 114 and the BEV antenna 118. A charging base 104 may include a wireless power transmitter configured to transmit the wireless power signal, and a CB antenna 114 operably coupled with the wireless power transmitter. One or more mechanical devices (e.g. actuators) may be used for adjusting the position of the BEV antenna 118 and/or the CB antenna 114 in at least one of an X, Y, and Z direction.

With a mechanical adjustment the system can be operated at an optimum coupling that is adjusted based on the load, thus maximizing efficiency. Moreover, a mechanical adjustment of coupling may be used as variable impedance transformer to adjust different loading conditions as presented by the vehicle's battery (constant voltage sink) at different charge levels.

A system using mechanical antenna adjustment may not need passive matching, compensation or tuning networks or active circuitry e.g. DC-to-DC conversion, thereby reducing complexity of the circuitry and electric losses.

Figure 12:
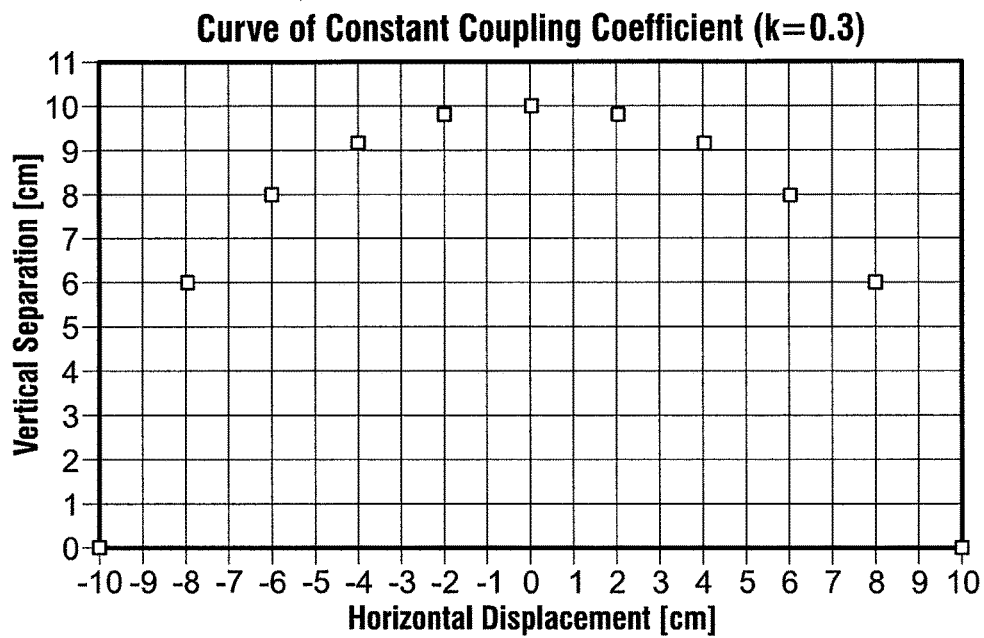
FIG. 12 illustrates an example curve of a coupling coefficient as a function of a horizontal and vertical displacement.

In a system providing vertical adjustment only (Z axis adjustment), lateral (or X axis) displacement and longitudinal (or Y axis) displacement may be fully or partially compensated for by lowering the BEV antenna 118 closer to the charging base 104. FIG. 12 illustrates an example curve of a coupling coefficient as a function of a horizontal and vertical displacement. In FIG. 12, horizontal displacement refers collectively to lateral (X axis) displacement and longitudinal (Y axis) displacement as discussed above. As illustrated in FIG. 12, displays points of constant coupling coefficient (k=0.3) as measured in a system using a pair of ferrite-backed 34 cm diameter antennas. In this system, a coupling coefficient of 0.3 is achieved at 10 cm separation for zero horizontal displacement and at 6 cm vertical separation for 8 cm horizontal displacement. Assuming some additional inherent tolerance to coupling coefficient variations, a maximum alignment error of more than 10 cm may be supported with vertical adjustment only. This tolerance range may be increased by using at least one of a BEV antenna 118 and CB antenna 114 having a larger diameter. According to some embodiments, a system supporting two nominal power levels e.g. 3.3 kW and 6.6 kW, power transfer at 6.6 kW may require a vertical separation of approximately 7 cm to achieve the nominal coupling conditions the system is designed for, also assuming zero displacement.

Conversely, a system providing horizontal alignment only may also use this mechanical system to compensate for excessive coupling. For example, if the vehicle is heavily loaded resulting in a smaller air gap, the system may displace one of the BEV antenna 118 and the CB antenna 114 to adjust coupling therebetween.

Figure 13:
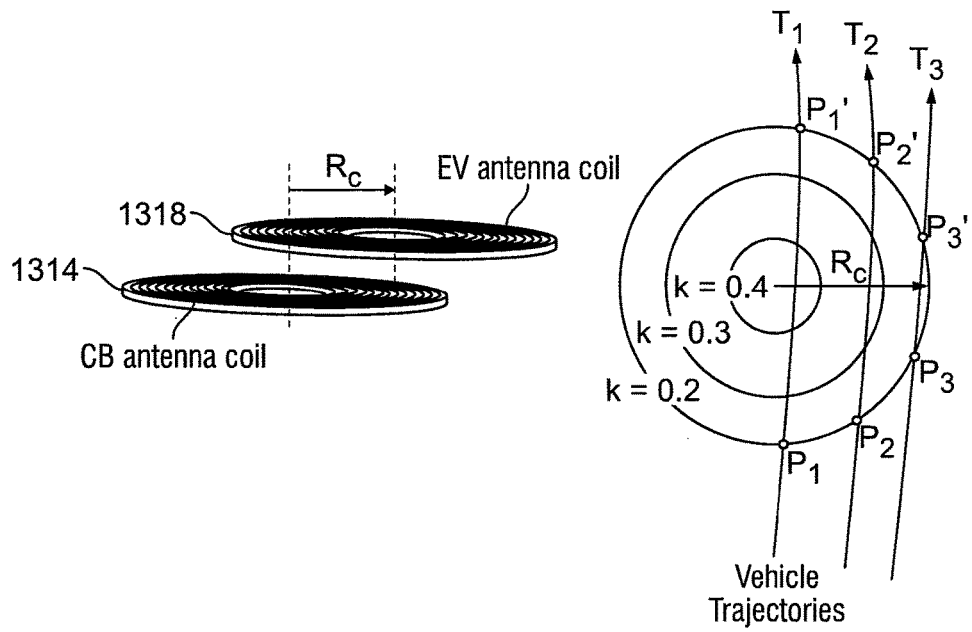
FIG. 13 illustrates circular-shaped electric vehicle (EV) and charging base (CB) antennas including curves of constant coupling between the BEV and CB antennas.

In a system using a fixed BEV antenna 118, increased lateral alignment tolerance may be achieved by dimensioning antennas to have a large enough size in order to provide excessive coupling (e.g. k>0.4) if perfectly aligned. The coupling coefficient required for energy transfer at nominal power level may be considerably lower (e.g. k=0.2). In this system the vehicle will be stopped at a point on its trajectory where the target coupling coefficient is achieved. This concept is based on the assumption that longitudinal alignment (e.g. y direction) can be more easily achieved by the driver than lateral alignment (e.g. x direction) and is further illustrated in FIG. 13. FIG. 13 illustrates circular-shaped electric vehicle and charging base antennas including curves of constant coupling between the BEV and CB antennas. Curves of constant coupling coefficient (isolines) show concentric circles with radius corresponding to the horizontal displacement of the BEV antenna 118. The circle with radius Rc corresponds to an area at which the target coupling coefficient (e.g. k=0.2) may be achieved. Therefore, as illustrated in FIG. 13, for any trajectory (e.g. T1, T2, T3) passing near a center point of a charging base and within the radius Rc of the center point of a CB antenna, there exists a pair of coupling position points (e.g. P1, P1', P2, P2', and P3, P3') where target coupling can be achieved.

In case of a trajectory with minor lateral offset (e.g. $T_1$), the two points $P_1$ and $P_1'$ may considerably differ from the center point of the CB antenna 114 with reference to the longitudinal (e.g. y direction) park position. In such a case, the driver may need to choose either coupling position point $P_1$ or $P_1'$ based on the type of vehicle and relative positing of the BEV antenna 118.

The process of parking a BEV 102 so as align the antennas at coupling position points of constant coupling coefficient may supersede any complex and lossy circuitry to adapt the wireless power system to varying coupling conditions. Alignment based on the coupling position points may also be tolerant to BEV antenna height variations. For example, for heavy loading or low tire pressure, curves of constant coupling coefficient may simply expand providing even more lateral parking tolerance. Further, assuming high antenna Q-factors resulting in a strongly coupled resonance regime down to a target coupling coefficient (e.g. k=0.2) there will be little to gain in efficiency between the target coupling coefficient and maximum coupling (e.g. k=0.4). This will be particularly true, if additional losses from adaptive matching networks are factored in.

FIGS. 14A-14D illustrate examples of mechanical alignment using an eccentrically rotatable and vertically movable antenna installed at the underside of a BEV at a suitable position. FIG. 14A illustrates a bottom view of a BEV 102 and FIGS. 14B and 14C illustrate a top view of the BEV 102. FIG. 14D illustrates side views of the BEV 102 having a BEV antenna 118 in a stowed state, and a deployed state.

As illustrated in FIG. 14A, BEV antenna 118 may be carried by a spindle 1402 housed in an actuator or spindle box 1401 as illustrated in FIG. 14B. Through operation of the actuator (or motor), the BEV antenna 118 can be rotated and moved up and down. The axis of rotation may be located between the two front seats where there is potential space for an actuators and the spindle 1402 when the antenna is fully retracted. When the system is in a non-charging state, BEV antenna 118 may be stowed in a cavity in the vehicles underbody, in a non-protrusive position, so that a vehicle's ground clearance is not compromised and the BEV antenna 118 is well protected from mechanical and environmental impacts. During wireless charging, the BEV antenna 118 may be deployed and lowered to a height providing a coupling coefficient as required at the desired charging power level. When deployed, the BEV antenna 118 may also be eccentrically rotatable as illustrated in FIG. 14D. FIGS. 14A-14D illustrate a mechanical solution for a BEV antenna 118. Through operation of mechanical components (e.g. motors/actuators), the position of the BEV antenna 118 in all three dimensions may be adjusted.

It can be seen that there exists an angle of rotation at which CB and BEV antenna align for any lateral displacement of the BEV 102 relative to a charging base 104 within a range given by the eccentricity of rotation if the vehicle is stopped at a distinct longitudinal position. The eccentricity of rotation may be defined by the distance between the BEV antenna 118 center point and axis of rotation. The angle of rotation (φ) may be defined by an initial position vector with an origin at the axis of rotation of the BEV antenna 118 and pointing towards the center of the antenna at the initial position and the longitudinal axis of the BEV 102. According to some embodiments, the BEV antenna 118 is at zero angle of rotation when stowed in the cavity as shown in FIG. 14D.

It can also be seen that a maximum angle of rotation of +/−90 degrees may be sufficient to find a point of alignment for any lateral position within a range given by the eccentricity of rotation. Such limitation of angle of rotation may simplify mechanics and may be favorable in regards to the antenna wiring that is to be incorporated into the spindle 1402.

The effective parking tolerance that may be supported by the system may be higher than the eccentricity of rotation since the wireless power link may provide some inherent tolerance to alignment errors. This will be particularly true if the system of alignment additionally makes use of vertical distance reduction to compensate for lateral errors as described above. In this case the resulting effective parking tolerance may also depend on the nominal coupling coefficient as required to support energy transfer a particular power level (e.g. at 3.3 kW and at 6.6 kW) and on the corresponding minimum air gap provided.

FIGS. 15A-15C illustrate a method of guidance and alignment based on the concept of an eccentrically rotatable BEV antenna 118. This method may assume that the system determines at least one of an angle of direction and a position of the vehicle relative to the CB antenna to guide the BEV 102 into a parking area 106, and in proximity of a charging base 104, and to align the BEV antenna 118 and the CB antenna 114. The center points of BEV antenna 118 and CB antenna 114 as well as a coordinate system defined by the vehicle's longitudinal axis may be assumed as references to determine angle of direction and position.

FIG. 15A-15C illustrate guidance and alignment for forward parking of a BEV 102. According to some embodiments, as illustrated in FIG. 15A, the system may be initially configured to operate in an 'approach phase' as a BEV 102 approaches a parking area 106. The system may use an angle of direction to guide the BEV 102 to the parking area 106. This guidance step may begin when the vehicle crosses the edge of a parking lot, which may be referred to as a 'landing phase.' As illustrated in FIG. 15B, when the BEV 102 is within range of the charging base 104, the system may be configured to operate in the 'landing phase' and the BEV 102 may begin to eccentrically rotate the BEV antenna 118 by an angle such that an antenna vector points from the center of the BEV antenna 118 to the center of the charging base 104 as will be described in greater detail with reference to FIGS. 16A-16B below. This procedure will automatically minimize the distance between the center points of the BEV antenna 118 and the CB antenna 114, thus maximizing coupling.

The eccentric rotation of the BEV antenna 118 may reduce the requirements on parking precision. For any vehicle trajectory passing near the charging base 104, with a lateral deviation not exceeding eccentricity of rotation, there exists a point where antennas will be substantially aligned. As illustrated in FIG. 15C, the BEV 102 may be stopped at this point based on position information provided by the system. The system operation illustrated in FIG. 15C may be referred to as an 'alignment phase.' The position of the BEV antenna 118 may then also be adjusted to adjust the height for improved energy transfer, assuming a system that supports vertical adjustment.

The alignment geometry of the BEV antenna 118 and the CB antenna 114 will be described in greater detail with reference to FIGS. 16A-16B. FIGS. 16A-16B illustrate various alignment geometries between BEV and CB antennas. FIG. 16A illustrates some alignment geometries for forward parking, while FIG. 16B illustrates some alignment geometries for reverse parking. FIGS. 16A and 16B indicate reference points C and E, which correspond to a center of a CB antenna 114 and center of a BEV antenna 118, respectively. FIGS. 16A and 16B also include an axis of rotation A, about which the BEV antenna 118 may be rotated, and an initial position vector v having an origin at the center of the axis of rotation A and pointing towards the center of an initial position of the antenna 118 and the longitudinal axis of the BEV 102. Furthermore, FIGS. 16A and 16B include the vehicle's local coordinate system (x direction, an y direction), the BEV antenna vector E having an origin at axis of rotation A of the BEV antenna 118 and pointing towards a center of the charging base C. Further, FIGS. 16A and 16B illustrate the angle of rotation ($\varphi=\varepsilon$) from the initial position of the BEV antenna 118 for orientation of the BEV antenna 118 and the charging base 104 as discussed above with reference to FIG. 15B. As illustrated in FIGS. 16A and 16B, the angle of rotation ε corresponds to the angle between the initial position vector v and the antenna vector E.

A different antenna orientation protocol may apply to forward and reverse parking as shown in FIG. 16A and FIG. 16B. In forward parking, the antenna vector E may point towards the center C of the charging base 114 at an angle ε relative to the vehicle's y-axis, whilst in reverse parking the antenna is rotated to an angle 180°-(180°+ε)=−ε, where (180°+ε) defines the angle as measured between y-axis and the connecting line A-C. In this way, the angle of rotation for adjusting the BEV antenna 118 is reduced, which may simplify mechanics Further, twisting of connecting wire bundles passing through the spindle may be substantially avoided.

In another method of alignment, the eccentrically rotatable antenna remains fixed (e.g. $\varphi=0$) until a BEV base 120 is proximate to the charging base 104 (e.g. as discussed with reference to FIG. 15B above) where the BEV antenna 118 and the CB antenna 114 would become aligned if rotated by a certain angle. The position of the center E of the BEV base 120 relative to the center C of the charging base 104 may be continuously computed. The rotation of the antenna may be modeled by the system during the approach of the BEV base 120 to the charging base 104. The BEV 102 may come to a stopped position when the system determines that the modeled rotating antenna is aligned with the CB antenna 114. After the vehicle has stopped, the BEV antenna 118 may be deployed and rotated for alignment with the CB antenna 114. This method may be reduce the risk of damage to the BEV antenna 118 due to interaction with obstructions since the BEV antenna 118 is not deployed until the BEV 102 is in a stopped position.

Different approaches for direction and position finding have been proposed. A simple method that reuses components already existing in the wireless power core system uses the LF magnetic near field as generated by the CB antenna 114 for direction and position finding. A dedicated frequency may be used for this kind of beacon emission. Power conversion as used for power transfer may be employed to generate the beacon signal. BEV antenna 118 and CB antenna 114 current levels as required for the beacon may be significantly lower than those for wireless charging. Further, very little power is radiated into space since radiation efficiency of CB antenna 114 at LF is extremely low.

The use of a quasi-stationary near field for vehicle guidance and alignment may be suitable as the field rapidly decays with increasing distance (third power law), thus reducing risk of interference from neighboring beacons. A frequency reuse pattern may solve the inter-cell interference problem. The beacon magnetic field surrounding the CB antenna 114 can be sensed by a three component (Φx, Φy, Φz) magnetic flux sensor which may be located in the center of the BEV antenna 118.

FIG. 17 illustrates a multidimensional sensor configured for detecting a direction of a beacon signal according to some embodiments. As shown in FIG. 17, the sensor 1700 may consist of an arrangement of three dimensionally spaced muti-turn loops wound around a core, such as a ferrite disk 1708. While illustrated as a ferrite disk 1708, the material forming the core is not limited thereto. The sensor 1700 may be integrated into the BEV antenna 118 at a central part of a ferrite backing 1710 of the BEV antenna 118. The ferrite disk 1708 may have a small size relative to a ferrite backing 1710 of the BEV antenna 118. The location of the sensor 1700, however, is not limited to the central portion of the BEV antenna 118. The central portion of the BEV antenna 118 may provide a suitable location since the central portion generally does not include a coil 1712 (e.g. a Litz wire disk coil), and may therefore have substantially little to no interference with the performance of the BEV antenna 118.

The sensor 1700 includes an x-loop 1702 wound about the ferrite disk 1708 and located in a first plane (e.g. x-axis), a y-loop 1704 wound about the ferrite disk 1708 and located in a second plane (e.g. y-axis) that is substantially perpendicular to the first plane, and a z-loop 1706 wound about the ferrite disk 1708 and located in a third plane (e.g. z-axis) that is substantially perpendicular to the first plane and the second plane. For example, the x-loop 1702 may be wound about the ferrite disk 1708 such that the x-loop 1702 passes through a substantially central portion of the ferrite disk along a first direction. The y-loop 1704 may be wound about the ferrite disk 1708 such that the y-loop 1704 passes through a substantially central portion of the ferrite disk along a second direction that is substantially perpendicular to the first direction. The z-loop 1706 may be wound about the ferrite disk 1708 such that the z-loop is formed as one or more concentric loops along the circumference of the ferrite disk 1708 and on a face of the ferrite disk 1708. The z-loop 1706 may also be wound about the ferrite disk 1708 along an outer edge or circumference of the ferrite disk 1708. The x-loop, y-loop, and z-loop may also be wound about the ferrite disk 1708 along other planes that are not substantially perpendicular to one anther. For example the x-loop, y-loop, and z-loop, may be wound about the ferrite disk 1708 along different planes, or planes that intersect one another.

Figure 18A:
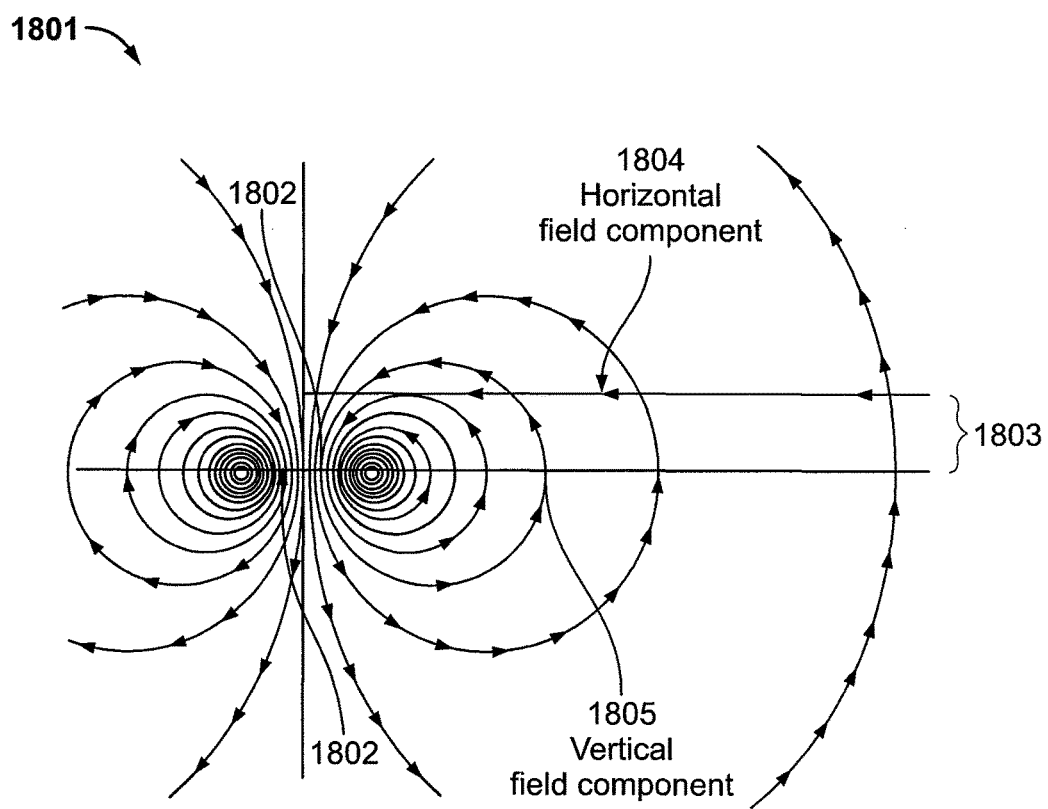
FIG. 18A depicts an electromagnetic field generated by a transmit antenna in accordance with some embodiments.

The ferrite backing 1710 may act to enhance sensitivity of the sensor 1700 through field concentration as will be described in greater detail below with reference to FIGS. 18A-18C. This may assist sensing by the x-loop 1702 and y-loop 1704 which may be used to detect a direction of a charging base 104 (having a CB antenna 114) when a BEV 102 is approaching the charging base 104, for example in a parking area 106, as described with reference to FIG. 15A above. When a sensor 1700 is at a particular distance from the charging base 104 such that that the sensor 1700 is at the edge of a beacon coverage area defined by the electromagnetic field generated by a CB antenna 114, horizontal components of field lines in a disk-shaped ferrite core become virtually parallel and the amount of flux passing through the ferrite core (e.g. ferrite disk 1708) is independent of rotation of the BEV antenna 118. As a result, the direction of the charging base 104 relative to a BEV base 120 may be found substantially without distortion.

With returned reference to FIGS. 3, and 15A-15C, and, as will be described in greater detail below, during operation of BEV guidance module 178, charging base 104 may be configured to transmit, via one or more transmitters, an electromagnetic field for guiding the BEV 102 which may be sensed by the BEV antenna 118 of the BEV base 120. Upon sensing of the guidance signal, a guidance and alignment system (e.g. BEV guidance module 178 and BEV alignment module 174) of the BEV 102 may be configured to utilize information derived from sensing signals to assist a driver of BEV 102. A controller, such as a BEV control unit 170 may control operation of the BEV alignment module 174 and BEV guidance module 178 to adjust a position a BEV antenna 118 in a lateral (e.g. X direction), and a longitudinal (e.g. Y direction).

The electromagnetic field generated by the charging base 104 and transmitted by the CB antenna 114 may comprise one or more very low frequency (VLF) (i.e., 3-30 KHz) or low frequency (LF) (i.e., 30-300 KHz) magnetic field patterns, which may be generated by a charging base 104 and received by one or more VLF or LF BEV antennas 118 within the BEV base 120. The BEV antenna 118 includes a sensor 1700 having an x-loop 1702, a y-loop 1704, and a z-loop 1706 as discussed above. A direction of a horizontal field component 1804 (e.g. x-axis) of the magnetic field, which points toward charging base 104, may be determined based on sensing signals received by the sensor 1700. Similarly, a vertical field component 1805 (e.g. y-axis) and a z-axis component (not shown) may be determined based on the sensing signals received by the sensor 1700.

The sensing of the electromagnetic field by the sensor 1700 will be explained in greater detail below with reference to FIGS. 18A-18C. FIG. 18A depicts an electromagnetic field generated by a transmit antenna in accordance with some embodiments. FIG. 18B illustrates a side-view of a sensor 1700 and an electromagnetic field transmitted by a CB antenna 114 according to some embodiments. A CB antenna 114 may transmit an electromagnetic field 1801 having a horizontal field component 1804, which may be sensed by a sensor 1700. Antenna offset 1803 depicts an offset between a charging base antenna 114 and a BEV antenna 118.

Figure 18B:
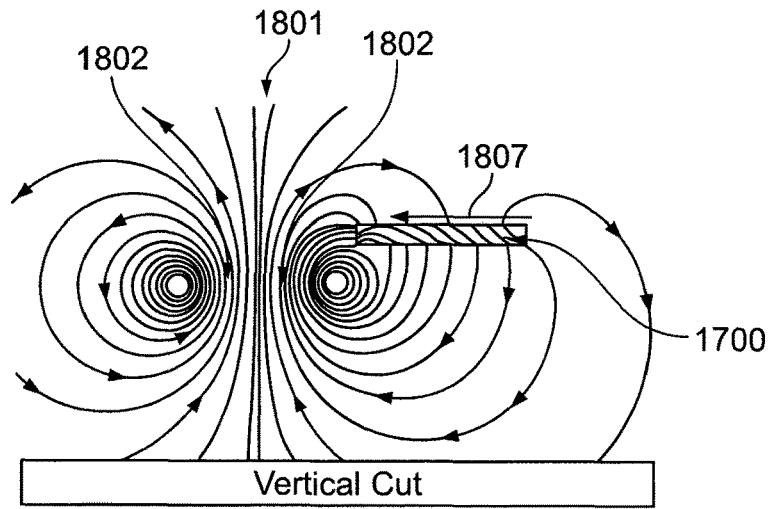
FIG. 18B illustrates a side-view of a sensor and an electromagnetic field generated by a CB antenna according to some embodiments.
Figure 18C:
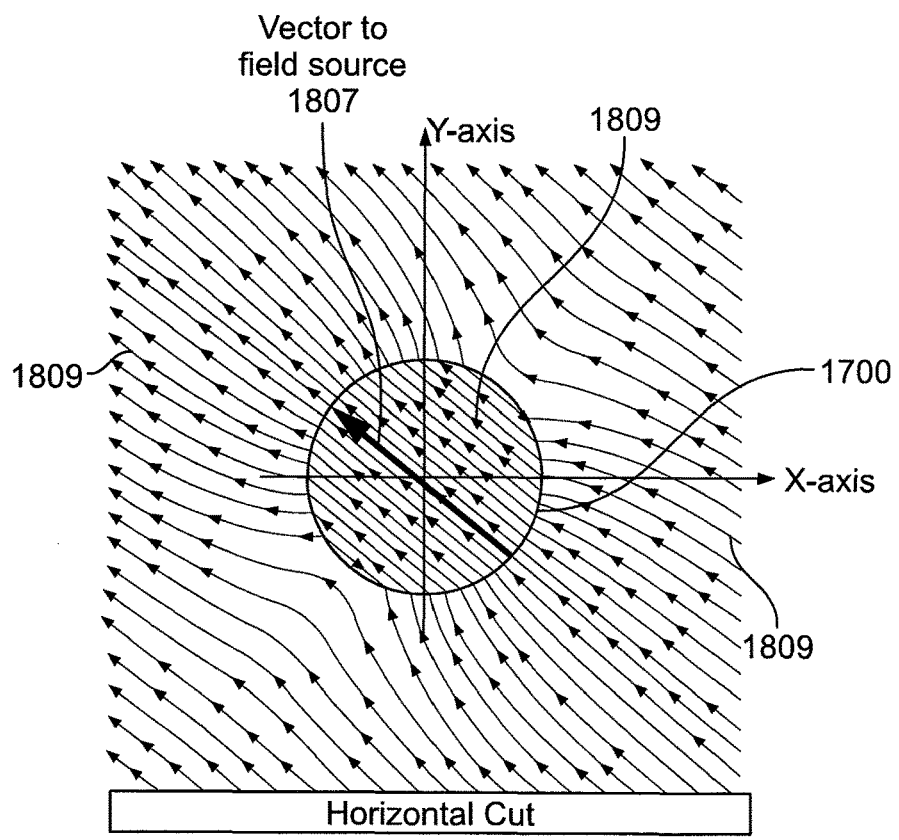
FIG. 18C illustrates a top-down view of a receive antenna positioned within an electromagnetic field, according to an embodiment.

As illustrated in FIG. 18B, a sensor 1700 (e.g. included in a BEV antenna 118) may interact with an electromagnetic field 1801 generated by a CB antenna 114 (not shown) at a location identified as 1802 in FIG. 18B. FIG. 18C illustrates a top-down view of the sensor 1700 positioned within the electromagnetic field transmitted by a CB antenna 114 according to some embodiments. With reference to FIGS. 18B and 18C, the direction of the flux lines 1809 of the electromagnetic field 1801 adjacent to the sensor 1700 may be oriented along a horizontal field component of electromagnetic field 1801 and in a direction toward a source of the electromagnetic field. The orientation of flux lines 1809 adjacent to antenna 1700 may be defined by a vector 1807, which points toward the source of the electromagnetic field as illustrated by location of source reference 1802 in FIG. 18B. The source of the electromagnetic field may be, for example, a charging base 104 having a CB antenna 114.

Figure 19:
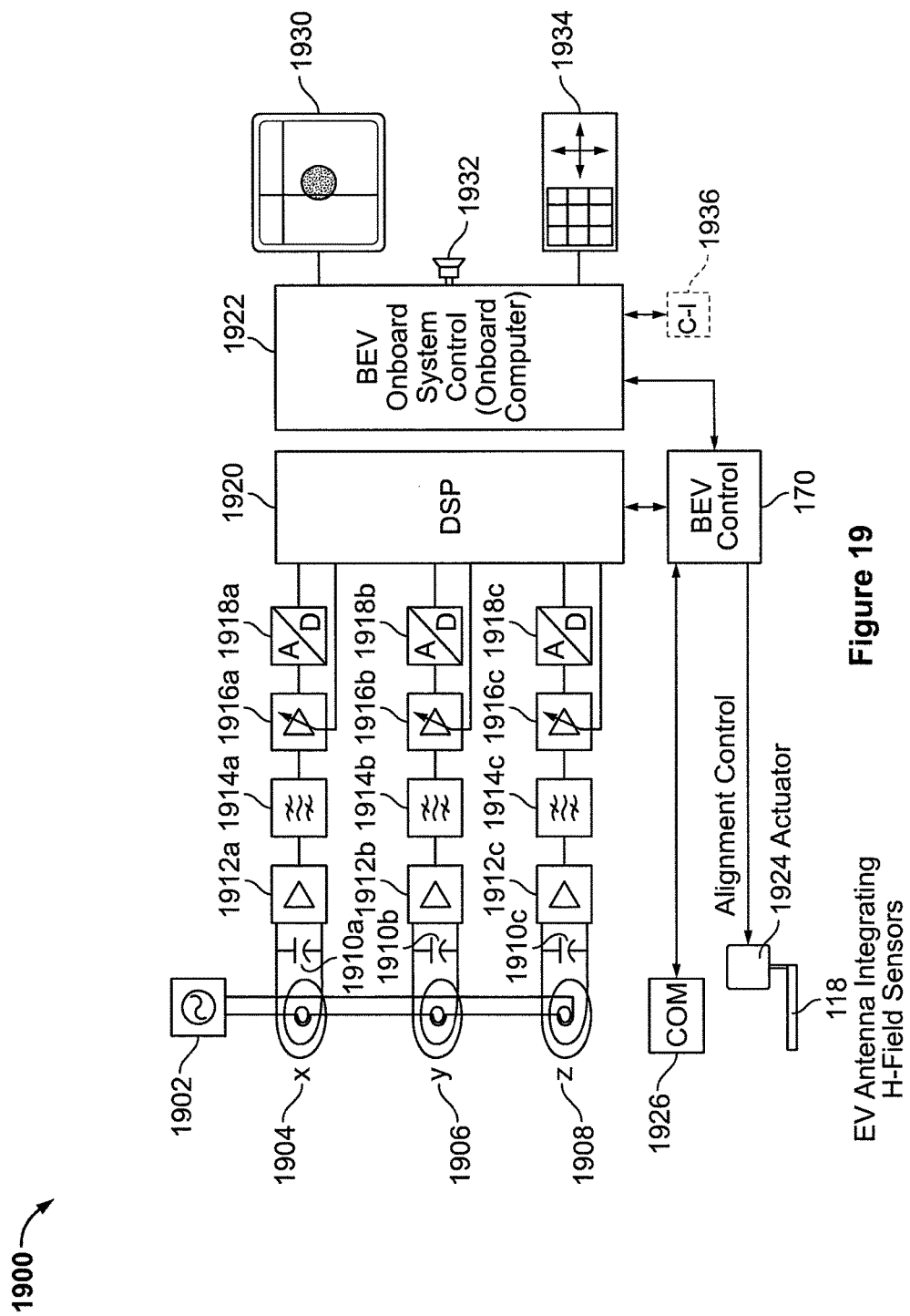
FIG. 19 illustrates a block diagram of a direction and position finding system including sensors and test/calibration functions.

FIG. 19 illustrates a block diagram of a direction and position system including sensors and test/calibration functions. The operation of the interface with a user through the BEV 102 and systems for alignment of the BEV antenna 118 with a CB antenna 114. The direction and position system 1900 includes a three-channel digital signal processor 1920 to estimate direction and position based on received sensor signals from a sensor including three dimensional component sensors 1904, 1906, and 1908. A test and calibration signal generator 1902 may be configured to calibrate the operation of the direction and position system 1900 prior to operation. For example, direction finding and positioning for purposes of parking assistance may require extra functionality for self test and calibration. The system's integrity test and calibration may be performed by incorporating an additional current loop in each of the three dimensional component sensors 1904, 1906, and 1908 and using a local signal generator emulating the beacon signal generated by the test and calibration signal generator 1902. The three dimensional component sensors 1904, 1906, and 1908, may be series connected in order to guarantee identical current flow. The system may be considered properly functioning and calibrated, if the computed signal vector matches with a reference vector within some defined tolerance, else, the system may initiate an automatic calibration procedure. If the system remains out of tolerance, the system may inhibit guidance and alignment and return an error message to an output device of the man-machine interface.

The direction and position system 1900 includes the three dimensional component sensors 1904, 1906, and 1908 (H-field sensors) for detecting a magnetic flux strength along an x-direction, y-direction, and z-direction, respectively. To enhance sensitivity of the three dimensional component sensors 1904, 1906, and 1908, the sensors may be coupled to resonance capacitors 1910A-1910C, and may be tuned to a particular beacon signal frequency using the variable resonance capacitors 1910A-1910C. The signals received by the sensors may be preconditioned using a preamplifier such as preamplifiers 1912A-1912C. The direction and position system 1900 may also include prefilters 1914A-1914C configured to receive the output of the preamplifiers 1912A-1912C and perform an anti-aliasing operation to increase a receiver's resilience to blocking. Variable Gain Amplifiers (VGA) 1916A-1916C may receive the output of the prefilters 1914A-1914C and be configured to perform a digitally controlled gain operation to increase the dynamic range of the analog signals. The output of the VGAs 1916A-1916C may be received by analog to digital conversion circuits (A/D) 1918A-1918C which are configured to convert the analog signals to digital signals.

In the digital domain, the three signals may be further processed in a digital signal processor (DSP) 1920 and filtered in the frequency domain using, for example a fast fourier transform (FFT) technique, to reduce noise and interference emanating from adjacent beacon signals or wireless charging systems. The DSP 1920 may be coupled to a BEV control circuit 170. The BEV control circuit 170 may perform similar functions to those described above with reference to FIG. 3. For example, the BEV control circuit 170 may be configured to provide an alignment signal to control operation of an actuator 1924 for positioning of a BEV antenna 118. The BEV control circuit 170 may also be configured to communicate with a communication module 1926 for communication with a charging base 104, other BEVs 102, or other systems.

The BEV control circuit 170 may also be coupled to a BEV on-board system control unit 1922 (e.g. an on-board computer of the BEV 102). The BEV on-board system control unit 1922 may interface with a user of the BEV 102 through various user interfaces, including, among other things, a visual indicator 1930 (e.g. a dashboard display), an audible indicator 1932 (e.g. car speakers), and an input device 1934 (e.g. a keyboard, touch screen, etc.). The user interface operations will be described in greater detail below with reference to FIGS. 20A-20C, 21A-21C, 22A-22D, and 23A-23D. The BEV on-board system control unit 1922 may also include an interface 1936 to other BEV 102 systems, such as parking, radar, steering, and braking systems.

Direction and position may be estimated by discriminating and mapping the three signals resulting in a three dimensional signal vector with unity magnitude. Thus position estimation may be independent of receive signal strength and may be based on direction and inclination of field lines at a position of the sensor 1700. This approach is advantageous in that that the performance of the system is generally resilient to variability of certain system parameters (e.g. beacon current level, ground material impact, etc.) A position may be determined by correlating the computed vector with a stored vector map. A point of maximum correlation may be used as an initial position estimate. The stored vector map may be individual for each type of vehicle and antenna installation, and may be produced and downloaded by the auto manufacturer as part of the system software.

The presence of metal in the ground or on the surface (e.g. iron reinforced concrete) may distort the field pattern to some degree. However, such distortion will primarily affect accuracy of positioning rather than that of direction finding. For example, with returned reference to FIG. 15B, the method of vehicle guidance may not require accurate positioning. Initially, positioning is only used to allow bring the BEV 102 in proximity to a charging base 104, where the BEV antenna 118 may deploy and start to orient towards CB antenna 114. This may occur at a distance of three times an antenna radius (e.g. 0.5 m) from the center point of a charging base 104. With decreasing distance to CB antenna 114, field distortion effects will diminish and position accuracy will improve, thereby enabling precise antenna alignment.

While not illustrated in FIG. 19, at least one of the three-dimensional component sensors 1904, 1906, and 1908 may be coupled to a power conversion circuit (e.g., BEV power conversion 116) to transfer power received via the wireless field to a load.

The sensor 1700 as described above is configured to determine at least one of a direction and a position from the three measured flux components $\Phi x$, $\Phi y$, $\Phi z$ using direction finding and positioning principles such as applied, for example, in avalanche victim locators. Since the direction of field lines will lead to the source of the magnetic field, the sensor 1700 may be used to guide and align a BEV 102 with a charging base 104. Through mapping of each sensed signal in a flux vector map that is representative for the flux component as generated by a CB antenna 114 and detected by a sensor 1700 mounted underneath of a vehicle, at least one of a direction and a position may be determined from the three detected flux components $\Phi x$, $\Phi y$, $\Phi z$.

The guidance and alignment interface operation and the interface with the user of the BEV 102 will be explained in greater detail with reference to FIGS. 20A-20C, 21A-21C, 22A-22D, and 23A-23D. FIGS. 20A-20C illustrate mapping of direction and position information for display during the different phases of parking in the case of forward parking. FIGS. 21A-21C illustrate mapping of direction and position information for display during the different phases of parking in the case of reverse parking. FIGS. 22A-22D illustrate mapping and displaying of guidance and alignment information during the different phases of parking in the case of forward parking based on an eccentrically rotatable BEV antenna. FIGS. 23A-23D illustrate mapping and displaying of guidance and alignment information during the different phases of parking in the case of reverse parking based on an eccentrically rotatable BEV antenna.

There may exist many different ways of displaying guidance and alignment information to the driver and the concepts described in the following description should be considered as a just one example. In the illustrated method, the vehicle's instantaneous heading or position is indicated using moving bars, while the target location in the center representing the target position of a charging base 104 (having a CB antenna 114) remains fixed.

Moreover, FIGS. 20A-20C and 23A-23C assume a mechanical system of alignment using an eccentrically rotatable BEV antenna 118 as described above. However, the method of displaying guidance and alignment information is of general applicability. The method may be used in conjunction with other methods of antenna alignment (mechanical, electronic) or with a system that used to model antenna rotation as described with reference to FIGS. 16A and 16B above, or a system that uses a fixed BEV antenna 118 (e.g. relying on the concept of parking on curves of constant coupling coefficient as described with reference to FIG. 13 above).

FIGS. 20A, FIG. 22A and FIG. 22B illustrate processing during an 'approach phase' of forward parking when the vehicle is crossing the edge of a parking lot and approaching a parking area 106. In this phase, the system mainly relies on direction finding. Accordingly, the guidance system displays the heading of the vehicle (y-vector) relative to a line connecting the center E of a BEV base 120 and a center C of a CB base 104. This information is displayed on a visual indicator 1930 to the user by a deflection of the vertical bar with an amount that is proportional to the angles between the y-vector and the connecting line between the center points E and C. Alternatively, a non-linear mapping function may be used. For example, a bar positioned on the right-hand side of the spot may indicate that the vehicle is offset to the right thus forcing the driver to adjust the vehicle to the left. A bar hitting the spot may indicate that the vehicle is heading towards the charging base 104.

FIGS. 20B and 22C generally illustrate what may be referred to as the 'landing phase' that is initiated at a radius ($R_c$) from the center C of the charging base 104 (or within a range 2000) based on the position as determined by the BEV on-board system control unit 1922. In the landing phase, the mode of displaying information is changed to a 'position' mode and a horizontal bar may appear at the bottom of the visual indicator 1930. In this mode, the vertical bar indicates lateral (x) deviation and the horizontal bar indicates longitudinal (y) deviation of the center E of the BEV antenna 118 from the center C of the CB antenna 114 as determined in the vehicle's local reference coordinate system. A suitable linear or partially non-linear function may apply to map estimated position onto display coordinates.

As discussed with reference to FIG. 15B above, with the beginning of landing phase and as part of the alignment process, the eccentrically rotatable antenna may be pointing to a center C of the charging base 104, thereby minimizing the distance between the points E and C. With a flux sensor 1700 integrated into the BEV antenna 118, the system may take this rotation into account in determining the position of the BEV antenna 118 relative to a CB antenna 114.

FIG. 20C and FIG. 22D show an 'alignment phase', where the BEV antenna 118 reaches a point of alignment and the BEV 102 is stopped by the driver. In this phase the displayed spot on a visual indicator 1930 may indicate the inherent tolerance range provided by the wireless charging system excluding mechanical alignment. As a result, the driver's challenge may be to get the bars crossing inside the spot area and to timely stop the vehicle. An acoustic alert and a stop sign (e.g. as illustrated in FIG. 22D) may be displayed to the user when the position is reached. During the alignment phase, the BEV antenna 118 is finely adjusted in position (e.g. 1 cm/s) to avoid overshoot.

The above descriptions analogously apply to reverse parking as illustrated in FIGS. 21A-21C and FIGS. 23A-23C.

The above described visual indication, direction, and alignment system may also refer to the position of the BEV base 120 relative to the charging base 104. The system may generally be capable of determining a position of the BEV antenna 118 included in the BEV base 120 relative to the CB antenna 114 included in the charging base 104. For example, for a deployable BEV antenna 118, the system may be capable of determining positioning of the BEV 102 based on a center point of the BEV antenna 118 in a deployed state relative to a CB antenna 114.

Though a system's inherent tolerance may within a few centimeters, mechanical alignment may considerably relax requirements on the driver in regards to lateral parking precision. For example, by using a mechanical alignment system, the antennas may be adjusted such that the vertical indication bar may be pulled into the spot when the BEV antenna 118 approaches the charging base 104. This is true as long as lateral offset of the vehicle's trajectory is within the range provided by the eccentricity of rotation. As a result, the rate of successful parking for charging on a first attempt may be increased.

The use of a quasi-stationary magnetic near field for vehicle guidance and alignment is considered particularly suitable as the field rapidly decays with increasing distance (third power law), thus reducing risk of interference from neighboring beacons. A frequency reuse pattern may be used to adjust for the inter-cell interference.

Figure 24:
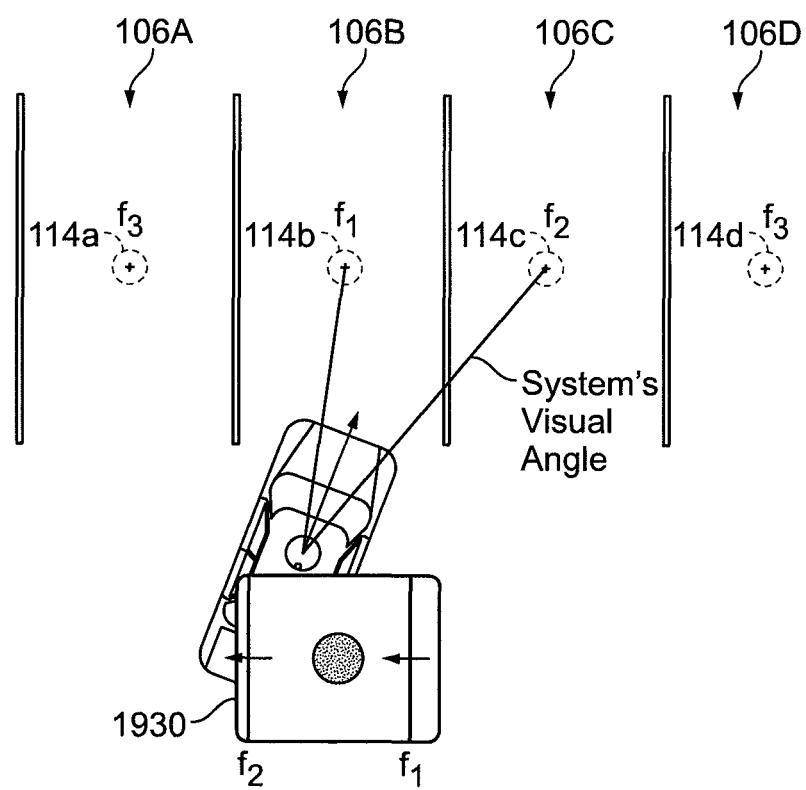
FIG. 24 illustrates discrimination between adjacent transmitting alignment and direction beacons.

FIG. 24 illustrates discrimination between adjacent transmitting alignment and direction beacons. For example, a parking lot may include multiple parking areas 106A-106D, each including a CB antenna 114A-114D, respectively. LF beacon-based guidance and alignment may be accomplished in presence of emissions from adjacent parking areas 106. There may be LF magnetic field emissions emanating from wireless charging or beacons of adjacent parking areas 106. These emissions may interfere with the wanted beacon signal causing unacceptable degrading of direction finding and positioning accuracy. Using beacon frequencies other than that for wireless energy transfer and a simple frequency re-use pattern e.g. $f_0$, $f_1$, $f_2$, $f_3$ as shown in FIG. 24 may reduce the interference. Beacon frequencies may be assigned to each CB antenna 114 at time of installation and system configuration Separation between the different beacon frequencies may be as small as 1 kHz, depending on the modulation bandwidth as needed to broadcast the beacon's ID. Frequencies may be selected to be substantially within the bandwidth of the resonant field sensors of the beacon receiver (direction and position finder). Sufficient separation from the wireless energy transfer frequency may be also required to avoid any issue with beacon receiver desensitization. Thus beacon frequencies may need to be allocated substantially out of resonance bandwidth of the wireless power link Resonance may become extremely sharp if a CB antenna 114 is unloaded (absence of charging vehicle). Assuming series resonance, since power conversion can provide high output voltages, the required beacon current may be generated in spite of the high impedance as presented by an antenna out of resonance.

As illustrated in FIG. 24, a BEV 102 may have visual angle directed to a CB antenna 114C located in a parking area 106C. However, the target parking area may be 106B. The BEV on-board system control unit 1922 may process all beacon signals that are detected above a defined threshold level, and determined to be within a reception range. Highly selective processing and direction finding of each detectable beacon may be accomplished in frequency domain using FFT techniques. Since the system's visual angle and the beacon's range are limited by design, a maximum of two beacons may provide an angle of direction that is within displayed window. Thus it may occur in some instances when vehicle is turning into a parking area that two bars (corresponding to parking areas 106B and 106C) will appear on the visual indicator 1930. In this case, the driver will initially rely on visual parking. When moving into the parking lot, the 'wrong' bar (corresponding to parking area 106C) will rapidly drop out of the displayed window rendering instrument parking unambiguous.

To avoid unnecessary emission and waste of energy, a charging base 104 may be silent in absence of parking vehicles and may be activated by the driver when approaching a parking lot. Beacon activation may be accomplished by generating a LF magnetic near field signal on the BEV antenna 118. This signal may be detected by the charging base 104 that may be also equipped with a receiver. This trigger signal may be common for all vehicles. Therefore, each charging base 104 within range of the trigger signal will wake up and start beacon emission. Since adjacent beacons may use different frequencies as described above, interference-free direction finding and positioning is possible.

Figure 25:
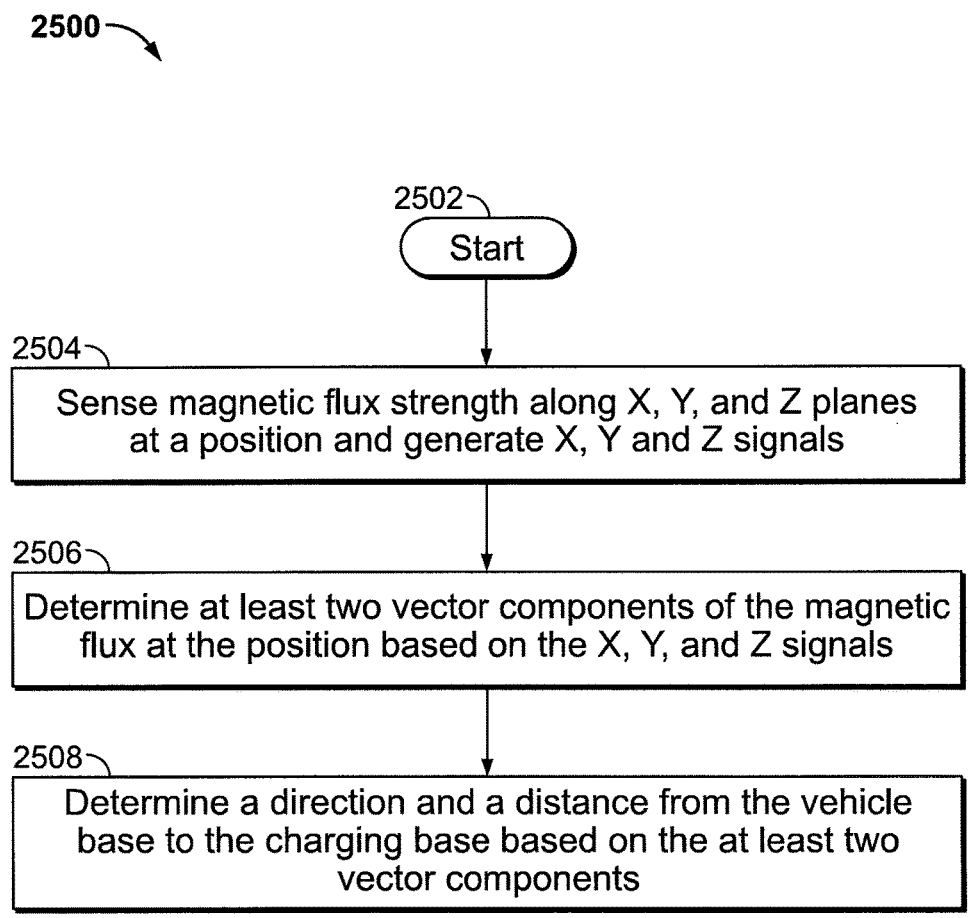
FIG. 25 illustrates a flowchart of a method of aligning a receive antenna and a transmit antenna according to some embodiments.

FIG. 25 illustrates a flowchart of a method of aligning a receive antenna and a transmit antenna according to some embodiments. A method 2500 may begin at start block 2502. The method may proceed to block 2504 for sensing a magnetic flux strength along an X, Y, and Z plane at a position and generate X, Y, and Z sensing signals. For example, a sensor 1700 as described above may include an x-loop 1702, a y-loop 1704, and a z-loop 1706 for sensing the magnetic flux in the X, Y and Z planes respectively. The method may proceed to block 2506 for determining at least two vector components of the magnetic flux at the position based on the X, Y, and Z signals. For example, the based on the sensing signals, an X, Y, and/or Z vector pointing towards a source for a magnetic field (e.g. a charging base 104 having a CB antenna 114). The method may proceed to block 2508 for determining a direction and a distance from a vehicle base (e.g. BEV base 120) to the charging base 104 based on the at least two vector components.

Information and signals as described above may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

Various modifications to the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for receiving wireless power, the apparatus comprising:
   a sensor coupled to a wireless power receive antenna, the wireless power receive antenna including a wireless power receive induction coil, the sensor collocated with the wireless power receive antenna, the sensor comprising:
      a core;
      a first coil wound about the core, the first coil located in a first plane;

a second coil wound about the core, the second coil located in a second plane that is different than the first plane and intersects the first plane; and a third coil wound about the core, the third coil located in a third plane that is different than the first and second planes and intersects the first and second planes, the sensor configured to determine at least two vector components of a first electromagnetic field at a particular point based on respective signals from each of the first coil, the second coil, and the third coil, each vector component comprising a magnitude and direction;

a processor configured to determine, based on the at least two vector components, a direction of a source of the first electromagnetic field with respect to the sensor and a distance to the source of the first electromagnetic field from the sensor; and a power conversion circuit configured to receive power from at least one of the first coil, the second coil, and the third coil to power a load.

2. The apparatus of claim 1, wherein the second plane is substantially perpendicular to the first plane, and wherein the third plane is substantially perpendicular to the first and second planes.

3. The apparatus of claim 1, further comprising a user interface configured to transmit alignment information to a user based on the direction and the distance.

4. The apparatus of claim 1, wherein the wireless power receive antenna additionally includes a wireless power receive core, and wherein the sensor is positioned in a central location of the wireless power receive core.

5. The apparatus of claim 1, further comprising an actuator configured to move the wireless power receive antenna relative to the source based on the direction and the distance.

6. The apparatus of claim 5, wherein the actuator is configured to move the wireless power receive antenna in a vertical direction relative to a ground surface.

7. The apparatus of claim 1, wherein the first electromagnetic field corresponds to a beacon signal transmitted by a transmitter, the apparatus further comprising a resonance capacitor configured to tune a resonant frequency of the sensor to the frequency of the beacon signal.

8. The apparatus of claim 1, further comprising a spindle connected to the wireless power receive antenna, and an actuator configured to control the spindle to rotate the wireless power receive antenna.

9. The apparatus of claim 1, wherein the processor is further configured to determine the at least one of a direction and a distance by discriminating and mapping the sensed electromagnetic field components into a multi-dimensional signal vector with unity magnitude.

10. The apparatus of claim 1, wherein the first electromagnetic field corresponds to a beacon signal transmitted by a transmitter, and wherein a frequency of the beacon signal is selected from a reuse pattern of a plurality of beacon frequencies.

11. The apparatus of claim 1, further comprising a display configured to provide guidance, alignment, direction, and position information.

12. The apparatus of claim 1, wherein the source of the first electromagnetic field is capable of charging a battery based on power collected by the wireless power receive antenna.

13. A method for receiving power via a first electromagnetic field at a position, the method comprising:

sensing a first signal indicative of a strength of the first electromagnetic field, the first signal corresponding to a first plane of the first electromagnetic field at the position;

sensing a second signal indicative of a strength of the first electromagnetic field, the second signal corresponding to a second plane of the first electromagnetic field at the position, the second plane being different than the first plane and intersecting the first plane;

sensing a third signal indicative of a strength of the first electromagnetic field, the third signal corresponding to a third plane of the first electromagnetic field at the position, the third plane being different than the first plane and the second plane and intersecting the first plane and the second plane;

determining at least two vector components of a first electromagnetic field at a particular point based on the first signal, the second signal, and the third signal, each vector component comprising a magnitude and direction;

determining, based on the at least two vector components, a direction of the source of the first electromagnetic field with respect to a sensor and a distance to a source of the first electromagnetic field from the sensor, the sensor coupled to and collocated with a wireless power receive antenna; and receiving a power signal associated with at least one of the first signal, the second signal, and the third signal to power a load.

14. The method of claim 13, wherein the second plane is substantially perpendicular to the first plane, and wherein the third plane is substantially perpendicular to the first and second planes.

15. The method of claim 13, further comprising displaying guidance and alignment information based on the direction and the distance.

16. The method of claim 13, further comprising moving the wireless power receive antenna relative to the source based on the at least one of the direction and distance.

17. The method of claim 13, wherein determining the direction and distance further comprises mapping the first signal, the second signal, and the third signal to a multi-dimensional signal vector with unity magnitude.

18. The method of claim 13, wherein the first electromagnetic field corresponds to a beacon signal transmitted by a transmitter, the method further comprising selecting a frequency of the beacon signal from a reuse pattern of a plurality of beacon frequencies.

19. The method of claim 13, further comprising charging a battery based on the received power signal.

20. An apparatus for receiving power via a first electromagnetic field at a position, the apparatus comprising:

means for sensing a first signal indicative of a strength of the first electromagnetic field, the first signal corresponding to a first plane of an electromagnetic field at the position;

means for sensing a second signal indicative of a strength of the first electromagnetic field, the second signal corresponding to a second plane of the first electromagnetic field at the position, the second plane being different than the first plane;

means for sensing a third signal indicative of a strength of the first electromagnetic field, the third signal corresponding to a third plane of the first electromagnetic field at the position, the third plane being different than the first plane and the second plane;

means for determining at least two vector components, each component comprising a magnitude and direction, of a first electromagnetic field at the position based on the first signal, the second signal, and the third signal;

means for determining, based on the at least two vector components, a direction of the source of electromagnetic field with respect to a sensor and a distance to the source of the first electromagnetic field from the sensor; and means for receiving power from at least one of the first signal, the second signal, and the third signal to power a load, the means for receiving power coupled to and collocated with the sensor.

21. The apparatus of claim 20, wherein the means for sensing a first signal comprises a first coil wrapped about a core, the first coil being located in the first plane, the means for sensing a second signal comprises a second coil wrapped about a core, the second coil being located in the second plane, the means for sensing the third signal comprises a third coil wrapped about a core, the third coil being located in the third plane, the means for determining the at least two vector components comprises a sensor, and the means for determining the direction to the source and the distance to the source comprises a processor.

22. The apparatus of claim 20, wherein the second plane is substantially perpendicular to the first plane, and wherein the third plane is substantially perpendicular to the first and second planes.

23. The apparatus of claim 20, further comprising means for receiving power capable of charging a battery from the source of the first electromagnetic field.

* * * * *